United States Patent
Kuno et al.

(10) Patent No.: US 8,634,555 B2
(45) Date of Patent: Jan. 21, 2014

(54) INFORMATION PROCESSING APPARATUS, INFORMATION PROCESSING METHOD, AND PROGRAM

(75) Inventors: Hiroshi Kuno, Kanagawa (JP); Takamichi Hayashi, Tokyo (JP); Munetake Ebihara, Kanagawa (JP); Kenjiro Ueda, Kanagawa (JP)

(73) Assignee: Sony Corporation, Tokyo (JP)

( * ) Notice: Subject to any disclaimer, the term of this patent is extended or adjusted under 35 U.S.C. 154(b) by 54 days.

(21) Appl. No.: 13/324,099

(22) Filed: Dec. 13, 2011

(65) Prior Publication Data

US 2012/0159196 A1 Jun. 21, 2012

(30) Foreign Application Priority Data

Dec. 20, 2010 (JP) ................................. 2010-282607

(51) Int. Cl.
*H04L 29/06* (2006.01)
(52) U.S. Cl.
USPC .......................................... 380/210; 380/278
(58) Field of Classification Search
None
See application file for complete search history.

(56) References Cited

U.S. PATENT DOCUMENTS

| | | | |
|---|---|---|---|
| 6,289,455 B1 * | 9/2001 | Kocher et al. ................. | 713/194 |
| 7,353,541 B1 * | 4/2008 | Ishibashi et al. ................ | 726/26 |
| 2004/0028227 A1 * | 2/2004 | Yu ................................. | 380/201 |
| 2006/0218647 A1 * | 9/2006 | Hars et al. ....................... | 726/27 |
| 2006/0239462 A1 | 10/2006 | Staring et al. | |
| 2007/0076870 A1 | 4/2007 | Takashima et al. | |
| 2007/0300078 A1 | 12/2007 | Ochi et al. | |
| 2009/0013195 A1 | 1/2009 | Ochi et al. | |
| 2009/0296929 A1 | 12/2009 | Wachtfogel et al. | |
| 2010/0310076 A1 | 12/2010 | Barzilai et al. | |
| 2011/0222691 A1 * | 9/2011 | Yamaguchi et al. .......... | 380/278 |

FOREIGN PATENT DOCUMENTS

| | | |
|---|---|---|
| EP | 1 777 628 A1 | 4/2007 |
| WO | WO 2005/013272 A1 | 2/2005 |
| WO | WO 2010/141174 A1 | 12/2010 |

OTHER PUBLICATIONS

Extended European Search Report Issued Apr. 26, 2012 in Patent Application No. 11192474.2.

* cited by examiner

*Primary Examiner* — Benjamin Lanier
(74) *Attorney, Agent, or Firm* — Oblon, Spivak, McClelland, Maier & Neustadt, L.L.P.

(57) ABSTRACT

A content providing system includes: a server which provides to a host apparatus a first encrypted content including an encrypted area having applied thereto a replacement key; a host apparatus which receives the first encrypted content and replacement key application area information indicating the encrypted area having applied thereto the replacement key from the server; and a data storage device which receives the replacement key from the server and an individual key set in terms of content distribution processing from the server and performs key replacement processing for changing the replacement key application area of the first encrypted content to an encrypted area by the individual key to store a second encrypted content after the key replacement processing in a data recording area.

19 Claims, 17 Drawing Sheets

FIG.13

| DISTRIBUTION PROCESSING UNIQUE ID | DISTRIBUTED CONTENT INFORMATION | INDIVIDUAL KEY (Kind) INFORMATION | DISTRIBUTION DESTINATION INFORMATION | DISTRIBUTION USER | DISTRIBUTION DATE/TIME INFORMATION |
|---|---|---|---|---|---|
| 5784102578 | ABC STORY | 2017fcad···31 | xyz@patnet.co.jp | SUZUKI ICHIRO | 2010.07.22 |
| 2354711245 | ABC STORY | 01269765···22 | kll@press.ne.jp | TANAKA KAORU | 2010.09.15 |
| ·· | ·· | ·· | ·· | ·· | ·· |

RECORDING APPARATUS (HOST EQUIPMENT) AND RECORDING MEDIUM (MEMORY CARD) MAY BE INDIVIDUALLY REGISTERED

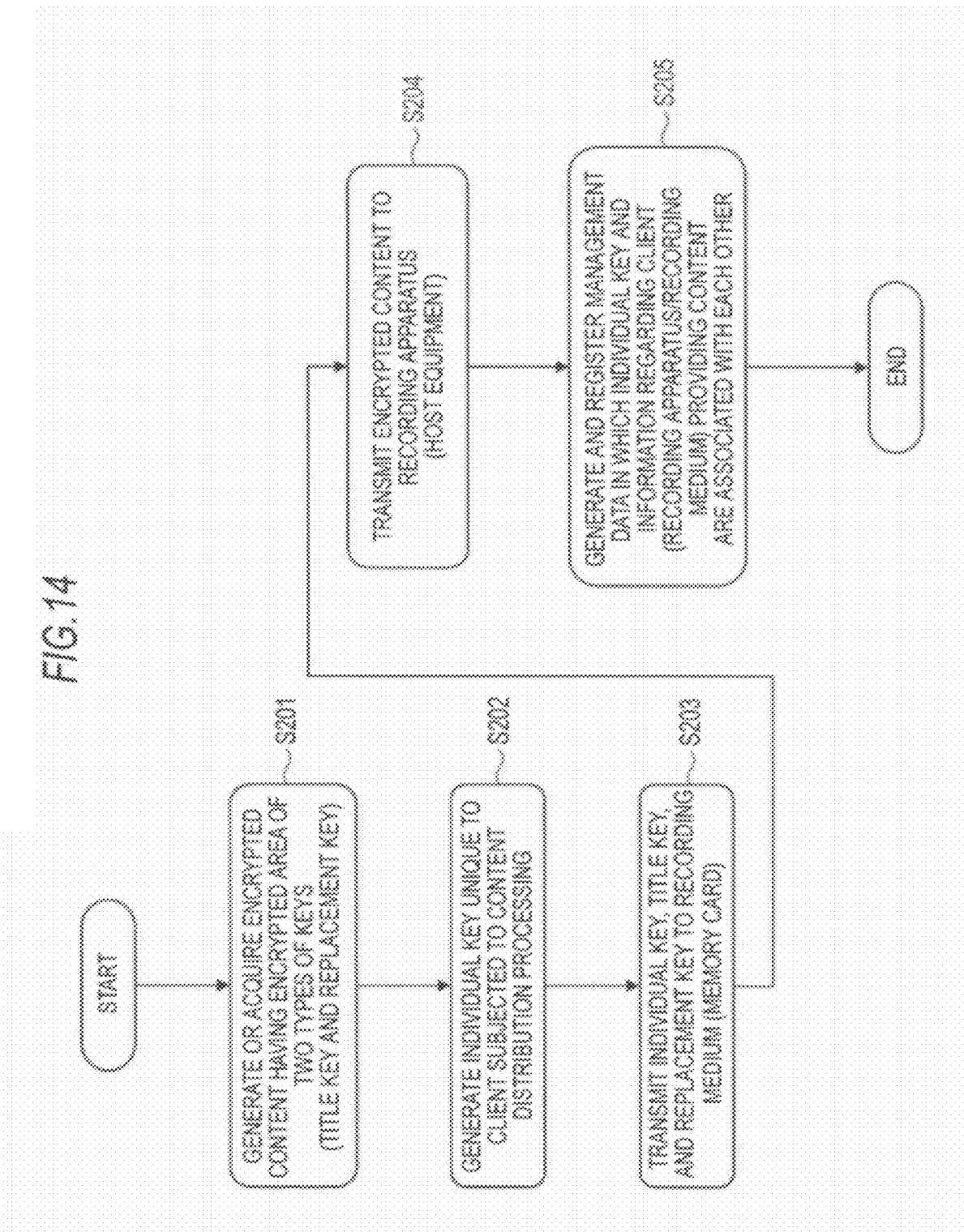

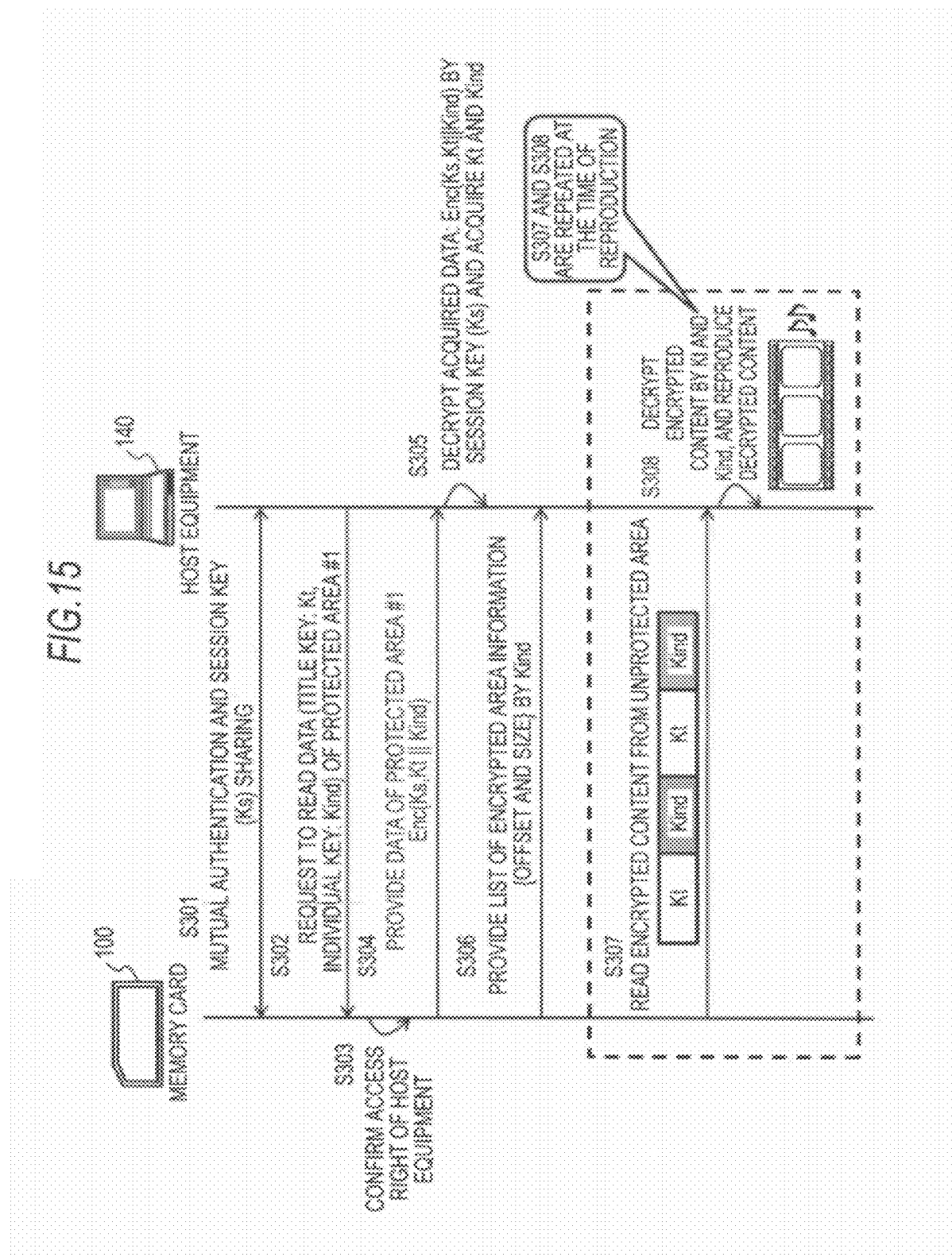

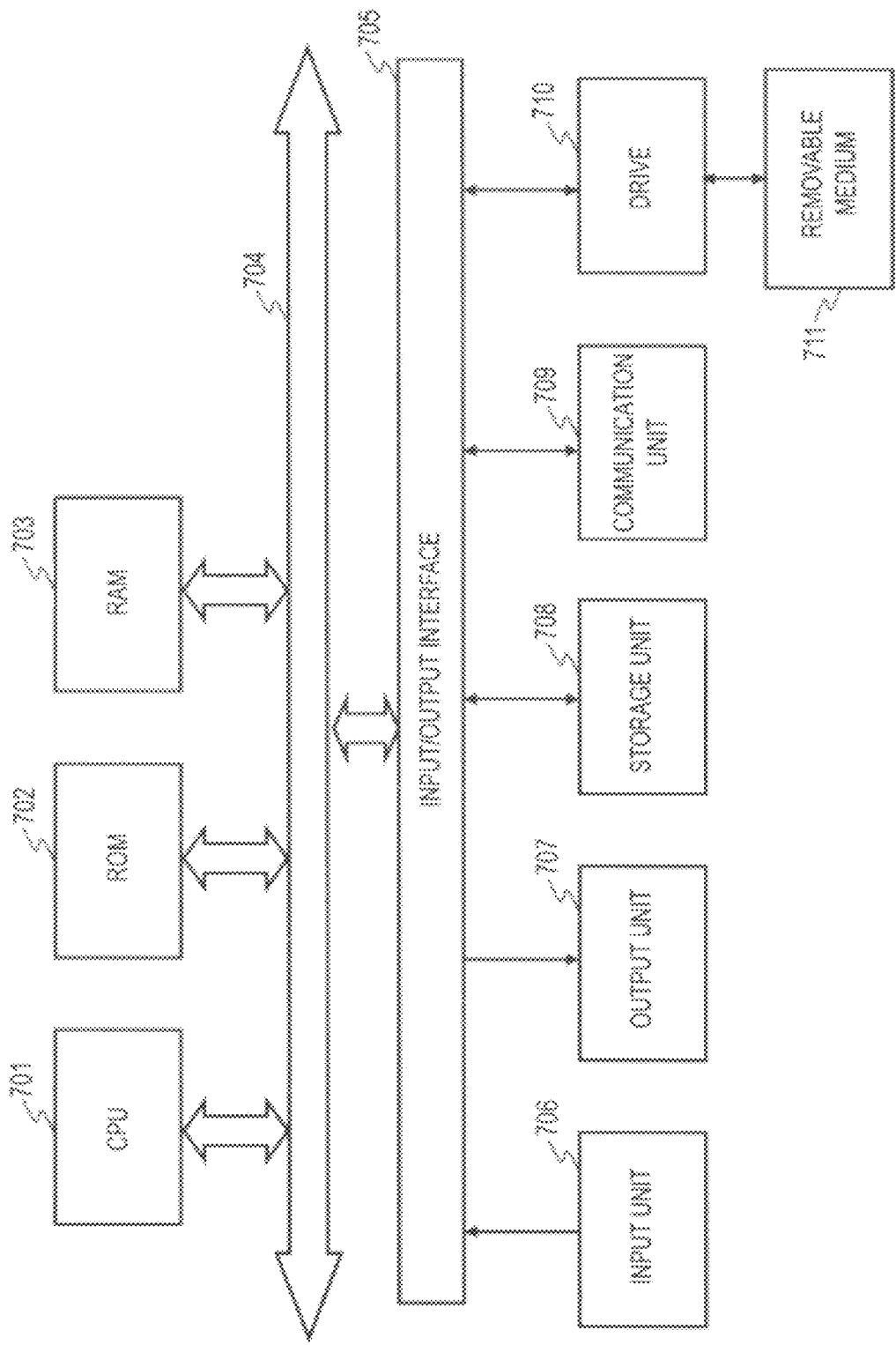

INFORMATION PROCESSING APPARATUS, INFORMATION PROCESSING METHOD, AND PROGRAM

FIELD

The present disclosure relates to an information processing apparatus, an information processing method, and a program. In particular, the present disclosure relates to an information processing apparatus, an information processing method, and a program which realize a configuration for preventing the unauthorized use of contents.

BACKGROUND

In recent years, as an information recording medium, various mediums, such as a DVD (Digital Versatile Disc), a Blu-ray (Registered Trademark) disc, and a flash memory, are used. In particular, a memory card, such as a USB memory with a large-capacity flash memory mounted therein, is widely used in these days. A user records contents, such as music or a movie, on various information recording mediums and loads the mediums in a reproducing apparatus (player) to reproduce the contents.

Recently, contents are actively distributed through a network, and the form of content purchase processing by the user is gradually shifted from purchase processing of disc with contents recorded thereon in advance to processing for downloading contents from a server connected to a network.

As a specific content purchase form, for example, there are the following content purchase forms, in addition to processing for purchasing a medium, such as a ROM disc.

(a) EST (Electric Sell Through) in which a user apparatus, such as a terminal or a PC which is connectable to the network, is used and connected to a content providing server to download and purchase contents.

(b) MoD (Manufacturing on Demand) in which a shared terminal installed in a public space, such as a convenience store or a station, is used to record contents on a medium (memory card or the like) of the user.

As described above, if the user has a medium, such as a memory card for recording contents, the user can freely select and purchase various contents from various content sources, such as content providers, and can record the contents on his/her medium.

The processing of EST, MoD, or the like is described in, for example, JP-A-2008-98765.

However, copyright, distribution rights, or the like of much content, such as music data and image data, are possessed by a creator, a seller, or the like. Thus, when providing contents to the user, control is performed such that there is a certain degree of use restriction, that is, only a user who has regular use rights is licensed to use contents and unregulated use, such as unpermitted copy, does not occur.

Specifically, when the user downloads contents, such as a movie, from the server and records the contents on a recording medium, such as a memory card of the user, for example, the following processing is performed.

The server provides contents to a client (user apparatus) as encrypted contents.

A key for decrypting the encrypted contents is provided only to a user who performs regular content purchase processing.

The content provision processing is performed to realize control of the use of contents.

However, even when the above-described processing is performed, for example, it is difficult to prevent a user who performs regular content purchase processing from providing the key for content decryption acquired from the server to another person. Specifically, there may be assumed a case where the key acquired from the server is put on a network or the like and set in a state of being usable by an unspecified number of people. If this action is carried out, anyone can decrypt, reproduce, and use the encrypted contents using the released key, and the unauthorized use of contents becomes widespread.

SUMMARY

It is desirable to provide an information processing apparatus, an information processing method, and a program which realize a configuration for effectively preventing the unauthorized use of contents due to the release of the key for use in decrypting encrypted contents.

An embodiment of the present disclosure is directed to a content providing system. The content providing system includes a server which provides to a host apparatus a first encrypted content including an encrypted area having applied thereto a replacement key, a host apparatus which receives the first encrypted content and replacement key application area information indicating the encrypted area having applied thereto the replacement key from the server, and a data storage device which receives the replacement key from the server and an individual key set in terms of content distribution processing from the server and performs key replacement processing for changing the replacement key application area of the first-encrypted content to an encrypted area by the individual key to store a second encrypted content after the key replacement processing in a data recording area.

In the content providing system, the data storage device may store the replacement key in a protected area where access from the outside is not permitted and may perform the key replacement processing inside the data storage device.

In the content providing system, the host apparatus may extract encrypted area data having applied thereto the replacement key from the first encrypted content received from the server in reference to the replacement key application area information and may provide the encrypted area data to the data storage device. The data storage device may perform key replacement processing for changing replacement key application encrypted area data received from the host apparatus to the encrypted area by the individual key.

In the content providing system, the server may provide to the host apparatus an encrypted content in which the replacement key application area as the encrypted area having applied thereto the replacement key in the first encrypted content and a title key application area as an encrypted area having applied thereto a content-compliant title key are mixed. The data storage device may receive the replacement key, the individual key, and the title key from the server, may store the replacement key in a first protected area where access from the outside is not permitted, and may store the individual key and the title key in a second protected area where access from an authorized external apparatus is permitted.

Another embodiment of the present disclosure is directed to a data storage device. The data storage device includes a data processing unit which performs key replacement processing for changing encrypted data by a replacement key input from the outside to encrypted data by an individual key set in terms of content distribution processing, a first protected area which is a storage area with the replacement key stored therein and in which access from the outside is inhibited, and a second protected area which is a storage area with the individual key stored therein and in which access from an authorized external apparatus is permitted.

The data storage device may perform mutual authentication with a server, under the condition of the establishment of mutual authentication, may receive the replacement key and the individual key from the server, may store the replacement key in the first protected area, and may store the individual key in the second protected area.

The data storage device may perform communication with a host apparatus to perform key replacement processing for changing replacement key application encrypted area data received from the host apparatus to an encrypted area by the individual key.

The data storage device may receive a host certificate recorded with access rights to the protected area from a host apparatus as a reproducing apparatus reproducing a content. When the access rights of the host apparatus to the second protected area is authorized on the basis of the description of the host certificate, the data storage device may provide the individual key stored in the second protected area to the host apparatus.

Still another embodiment of the present disclosure is directed to an information processing apparatus. The information processing apparatus includes a data processing unit acquires a first encrypted content including an encrypted area having applied thereto a replacement key and replacement key application area information indicating an encrypted area having applied thereto the replacement key, extracts encrypted area data having applied thereto the replacement key from the first encrypted content in reference to the replacement key application area information, provides the encrypted area data to a data storage device, receives individual key encrypted area data generated by key replacement processing in the data storage device, generates a second encrypted content in which the received data is set in an original replacement key application area, and stores the second encrypted content in the data storage device.

The information processing apparatus may further include a communication unit which receives the first encrypted content and the replacement key application area information from a server. The data processing unit may perform mutual authentication processing with the server, and under the condition of the establishment of mutual authentication, may receive the first encrypted content and the replacement key application area information from the server.

Yet another embodiment of the present disclosure is directed to a server apparatus. The server apparatus includes a data processing unit which performs processing for acquiring or generating a first encrypted content including an encrypted area having applied thereto a replacement key, the replacement key, an individual key which is an encryption key after key replacement to the encrypted area of the replacement key and set in terms of content distribution processing, and replacement key application area information indicating the encrypted area having applied thereto the replacement key, and transmitting the first encrypted content, the replacement key, the individual key, and the replacement key application area information to a client.

In the server apparatus, the data processing unit may perform mutual authentication processing with a data storage device which constitutes the client, under the condition of the establishment of the mutual authentication processing, may encrypt the replacement key and the individual key, and may transmit the encrypted replacement key and individual key to the data storage device.

In the server apparatus, the data processing unit may generate management information in which the individual key is associated with the client and may store the management information in a storage unit.

Still yet another embodiment of the present disclosure is directed to a reproducing apparatus which performs reproduction processing for reproducing an encrypted content including an encrypted area by an individual key set in terms of content distribution processing. The reproducing apparatus includes a data processing unit which performs mutual authentication processing with a data storage device, under the condition of the establishment of the mutual authentication processing, reads the individual key from the data storage device, acquires encrypted area information indicating the encrypted area by the individual key from the data storage device, and performs key selection in reference to the encrypted area information to perform decryption processing of the encrypted content.

Further another embodiment of the present disclosure is directed to an information processing method which is performed in a data storage device. The information processing method includes causing a data processing unit to receive encrypted data by a replacement key from the outside as input, causing the data processing unit to acquire the replacement key from a first protected area where access from the outside is inhibited and to perform decryption processing of the encrypted data to generate decrypted data, and causing the data processing unit to acquire an individual key set in terms of content distribution processing from a second protected area where access from an authorized external apparatus is permitted and to apply the acquired individual key to encrypt the decrypted data and to perform key replacement processing.

Still further another embodiment of the present disclosure is directed to an information processing method which is performed in an information processing apparatus. The method includes causing a data processing unit to acquire a first encrypted content including an encrypted area having applied thereto a replacement key and replacement key application area information indicating the encrypted area having applied thereto the replacement key, extract encrypted area data having applied thereto the replacement key from the first encrypted content in reference to the replacement key application area information, provide the encrypted area data to a data storage device, receive individual key encrypted area data generated by key replacement processing in the data storage device, generate a second encrypted content in which the received data is set in an original replacement key application area, and store the second encrypted content in the data storage device.

Yet further another embodiment of the present disclosure is directed to an information processing method in a server apparatus which performs content distribution. The information processing method includes causing a data processing unit to acquire or generate a first encrypted content including an encrypted area having applied thereto a replacement key, the replacement key, an individual key which is an encryption key after key replacement to the encrypted area of the replacement key and set in terms of content distribution processing, and replacement key application area information indicating the encrypted area having applied thereto the replacement key, and transmit the first encrypted content, the replacement key, the individual key, and the replacement key application area information to a client.

Still yet further another embodiment of the present disclosure is directed to a program which causes a data storage device to perform data processing. The program includes causing a data processing unit to receive encrypted data by a replacement key from the outside as input, causing the data processing unit to acquire the replacement key from a first protected area where access from the outside is inhibited and to perform decryption processing of the encrypted data to generate decrypted data, and causing the data processing unit to acquire an individual key set in terms of content distribution processing from a second protected area where access from an authorized external apparatus is permitted and to apply the acquired individual key to encrypt the decrypted data and to perform key replacement processing.

A further embodiment of the present disclosure is directed to a program which causes an information processing apparatus to perform information processing. The processing includes causing a data processing unit to acquire a first encrypted content including an encrypted area having applied thereto a replacement key and replacement key application area information indicating the encrypted area having applied thereto the replacement key, extract encrypted area data having applied thereto the replacement key from the first encrypted content in reference to the replacement key application area information, provide the encrypted area data to a data storage device, receive individual key encrypted area data generated by key replacement processing in the data storage device, generate a second encrypted content in which the received data is set in an original replacement key application area, and store the second encrypted content in the data storage device.

A still further embodiment of the present disclosure is directed to a program which causes a server apparatus to perform information processing. The information processing causes a data processing unit to perform the processing including acquiring or generating a first encrypted content including an encrypted area having applied thereto a replacement key, the replacement key, and an individual key which is an encryption key after key replacement to the encrypted area of the replacement key and set in terms of content distribution processing, and replacement key application area information indicating the encrypted area having applied thereto the replacement key, and transmitting the first encrypted content, the replacement key, the individual key, and the replacement key application area information to a client.

The program according to the embodiments of the present disclosure is a program which can be provided to an information processing apparatus or a computer system capable of executing various program codes by a recording medium or a communication medium. The program is provided in a computer readable form, such that processing according to the program is realized on the information processing apparatus or the computer system.

Other objects, features, and advantages of the present disclosure will be apparent from the detailed description based on the following embodiments of the present disclosure or the accompanying drawings. In this specification, a system refers to a theoretical collective configuration of a plurality of apparatuses and is not limited to apparatuses of different configurations in the same casing.

According to the configuration of the embodiment of the present disclosure, a configuration for preventing the unauthorized use of contents due to the release of an encryption key of contents is realized. For example, a replacement key application area encrypted by a replacement key in a content received from the server is decrypted, replacement processing of a key which is encrypted by applying a different individual key in terms of content distribution is performed, and an encrypted content after key replacement is stored in the data storage device. The key replacement processing is performed inside the data storage device, and the replacement key is stored in a protected area where access from the outside is inhibited. The individual key is stored in a second protected area where access to only an authorized apparatus, such as a reproducing apparatus, is permitted. The encrypted contents after key replacement are encrypted contents which differ between the clients, making it possible to specify a client as a release source of contents or the individual key.

BRIEF DESCRIPTION OF THE DRAWINGS

FIG. 13 is a diagram illustrating an example of data which is recorded in management information in a server.

FIG. 14 is a flowchart illustrating a provision processing sequence of contents to a client in a server.

FIG. 15 is a sequence diagram illustrating a content reproduction sequence in a reproducing apparatus.

FIG. 16 is a diagram illustrating a hardware configuration example of an information processing apparatus serving as a server and a client.

DETAILED DESCRIPTION

Figure 1:
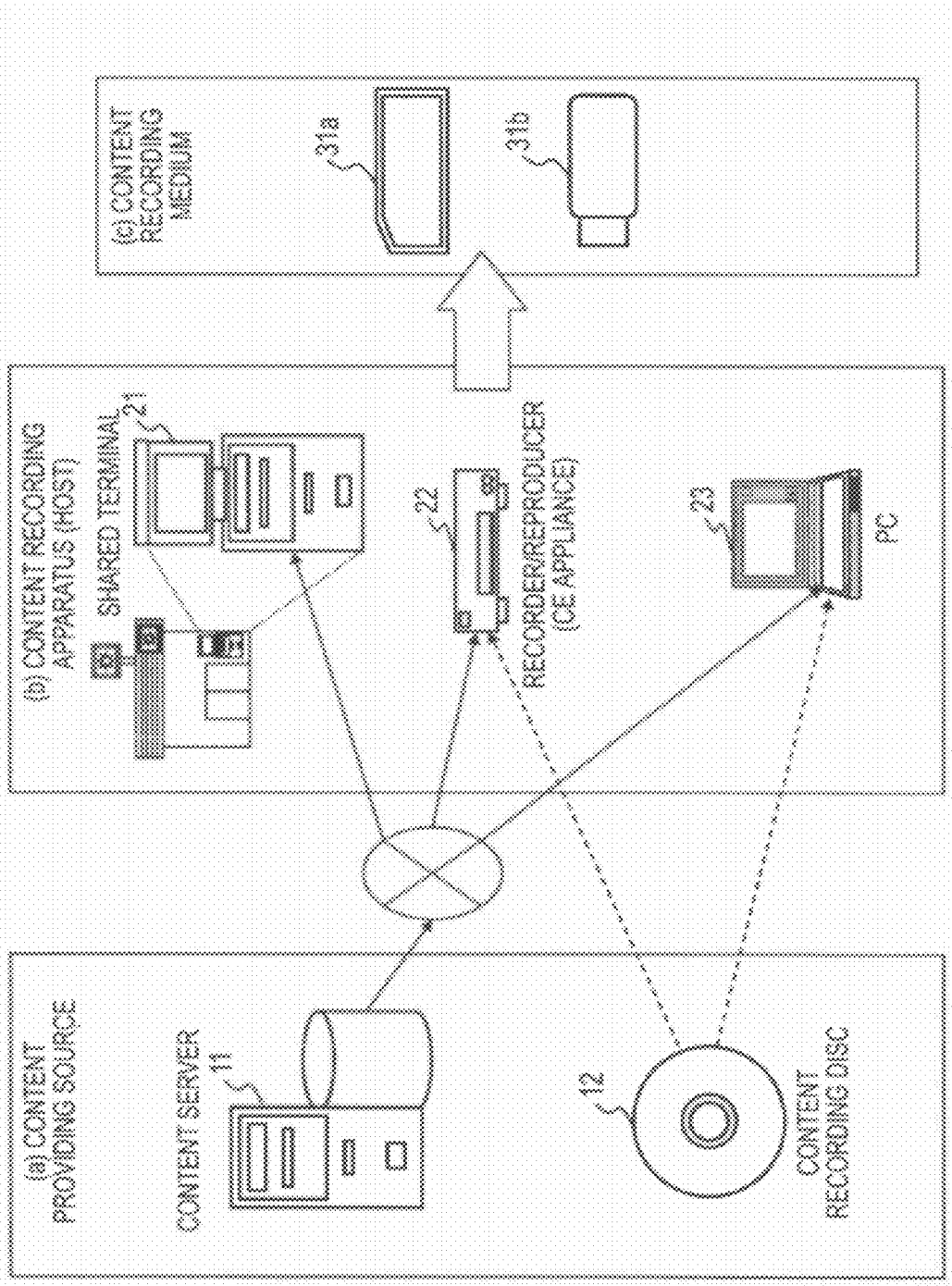
FIG. 1 is a diagram illustrating the outline of content provision processing and use processing.

Hereinafter, the details of an information processing apparatus, an information processing method, and a program according to an embodiment of the present disclosure will be described with reference to the drawings. The description will be provided in accordance with the following items.

1. Outline of content provision processing and use processing

2. Basic configuration example of contents and data to be provided to user in the related art 3. Configuration example of memory card serving as content recording medium 4. Example of content provision processing to client (user) according to an embodiment of the present disclosure 5. Content reproduction processing in client according to an embodiment of the present disclosure 6. Hardware configuration example of each apparatus

1. Outline of Content Provision Processing and Use Processing

Hereinafter, the details of an information processing apparatus, an information processing method, and a program according to an embodiment of the present disclosure will be described with reference to the drawings.

First, the outline of content provision processing and use processing will be described with reference to FIG. 1 and later figures.

FIG. 1 shows the following from the left.

(a) content providing source
(b) content recording apparatus (host)
(c) content recording medium The (c) content recording medium is a medium in which contents are recorded by the user and which is used in content reproduction processing. FIG. 1 shows, for example, memory cards 31a and 31b which have a recording portion constituted by a flash memory or the like.

The user records various contents, for example, music or movies in the memory card 31 and uses the contents. The contents are, for example, contents as a use control target, such as copyright management contents. Only use under a predetermined use condition is permitted and unregulated copy processing, unrestricted distribution of copy data, or the like is inhibited. In many cases, when recording contents in the memory card 31, copy restriction information, such as the number of allowable copies of recording contents or use control information (Usage Rule) which defines output restriction information to another apparatus or the like is also recorded.

The (a) content providing source shown in FIG. 1 is a providing source of use-restricted contents, such as music or movies. FIG. 1 shows a content server 11 and a content recording disc 12, such as a ROM disc, in which contents are recorded in advance.

The content server 11 is a server which provides contents, such as music or movies. The content recording disc 12 is a disc, such as a ROM disc, in which contents, such as music or movies, are recorded in advance.

The user can load the memory card 31 serving as the (c) content recording medium shown in FIG. 1 in the (b) content recording apparatus (host), and can connect the (b) content recording apparatus (host) to the content server 11 to receive (download) contents and to record the contents in the memory card 31.

During the download processing, the content server 11 performs processing in a predetermined sequence and provides information necessary for reproducing contents, such as key information to be applied to decrypt the encrypted contents, in addition to the encrypted contents. Use control information with respect to contents and content related information, such as a token in which content management information other than a content ID is recorded, may be provided.

Other than the download processing from the content server 11, the user may copy contents from the content recording disc 12 shown in (a) of FIG. 1 and may record the contents in the memory card 31 or the like serving as the (c) content recording medium.

For example, the user loads the content recording disc 12, such as a ROM disc, in which contents are recorded in advance, in the (b) content recording apparatus (host) in which the memory card 31 is loaded, and copies the recorded contents in the content recording disc 12 to the memory card 31. However, if the copy processing is performed in an unregulated manner, copy contents increase without limit. In order to prevent this situation, for example, at the time of content copy processing from a medium in which encrypted contents based on the AACS (Advanced Access Content System) standard, it is necessary to make a connection to the content server 11 and to perform processing in a predetermined sequence. The copy processing is called managed copy (MC). The AACS defines various standards for copyright protection of contents.

In the case of content copy based on the managed copy (MC), a recording/reproducing apparatus 22 or a PC 23 serving as the content recording apparatus (host) shown in (b) of FIG. 1 is connected to the content server 11, and use control information or a token corresponding to a copy content and content management information, such as key information to be applied in decrypting an encrypted content are received from the content server 11 and recorded in a copy destination medium.

The user can record contents in a content recording medium, such as the memory card 31 shown in (c) of FIG. 1 possessed by the user in one of the following forms and can use the contents.

download processing of contents from the server content copy processing from a disc having contents recorded thereon With regard to an apparatus which records contents in the medium of the user, as shown in the (b) content recording apparatus (host) of FIG. 1, there are various apparatuses described below.

a shared terminal 21 which is installed in a public space, for example, a station or a convenience store and can be used by an unspecified number of users a recorder/reproducer [CE (Consumer Electronics) equipment] 22 and a PC 23 serving as a user apparatus All the apparatuses can load the memory card 31 serving as the (c) content recording medium therein.

When a configuration is made in which the download processing from the content server 11 is performed, the (b) content recording apparatus (host) should include a communication unit which performs data transmission/reception processing through a network. When a configuration is made in which the content recording disc 12 is used, the (b) content recording apparatus (host) should be a disc reproducible apparatus.

As shown in FIG. 1, the user records contents downloaded from the content server 11 serving as the (a) content providing source or contents recorded on the content recording disc 12, such as the ROM disc, in the memory card 31 serving as the (c) content recording medium through the (b) content recording apparatus (host).

Figure 2:
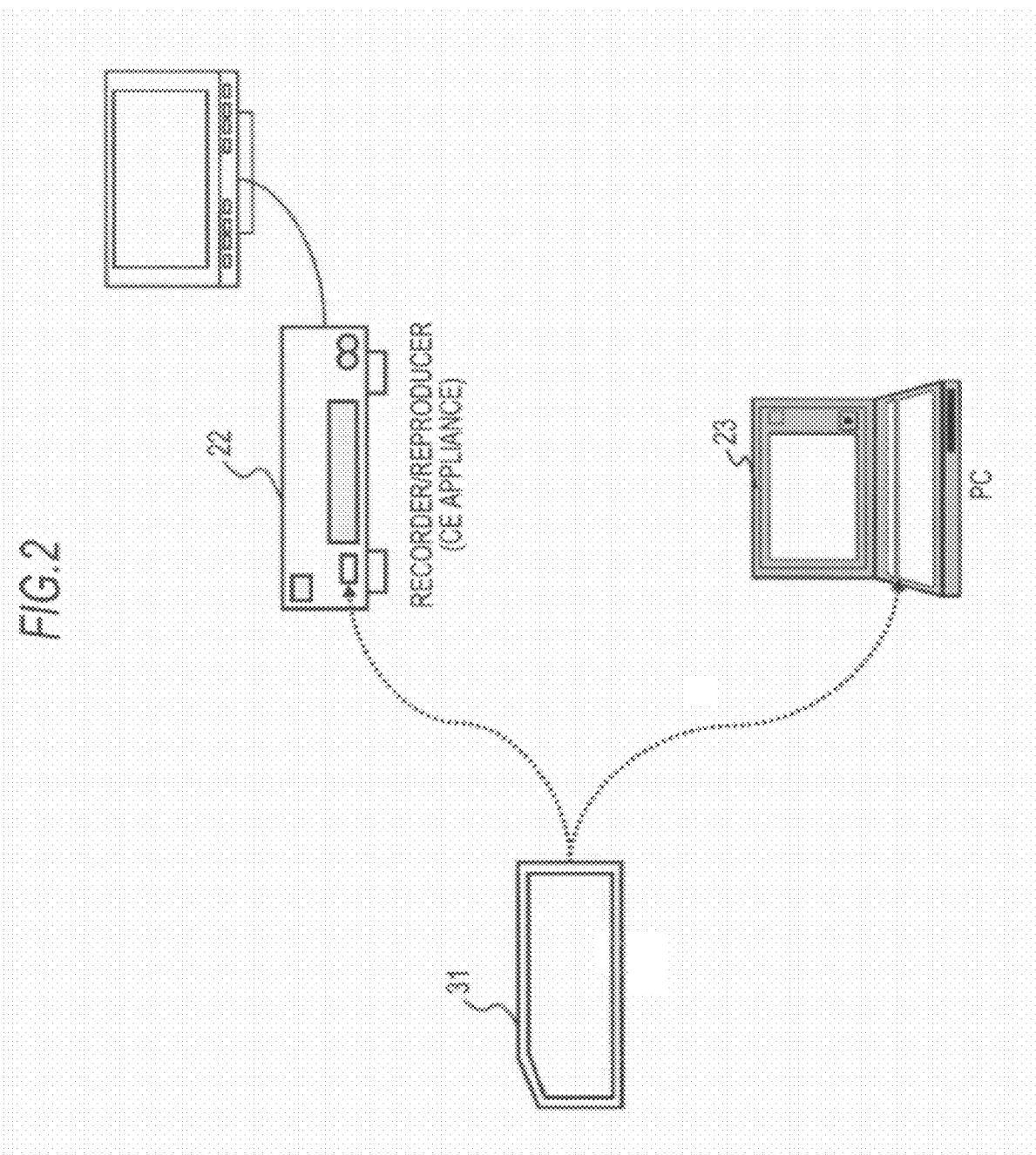
FIG. 2 is a diagram illustrating the use form of a content recorded in a memory card.

The use form of the contents recorded in the memory card 31 will be described with reference to FIG. 2.

The user loads the memory card 31 having recorded therein the contents in, for example, the recorder/reproducer (CE equipment) 22 or the PC 23 which is a user apparatus serving as the (b) content recording apparatus (host) described with reference to (b) of FIG. 1, and reads and reproduces the contents recorded in the memory card 31.

In many cases, the contents are recorded as encrypted contents, and a reproducing apparatus, such as the recorder/reproducer (CE equipment) 22 or the PC 23, reproduces the contents after performing decryption processing in a predetermined sequence.

Equipment which reproduces the contents recorded in the memory card 31 is not limited to the (b) content recording apparatus (host) described with reference to (b) of FIG. 1, and other reproducing apparatuses (players) may be used. However, it is necessary that the equipment can perform the decryption processing or the like of the encrypted contents in a predefined sequence, that is, the equipment stores a program which executes a predefined reproduction processing sequence. The details of the content reproduction sequence will be described below.

2. Basic Configuration Example of Content and Data to be Provided to User in the Related Art Next, a basic configuration example of a content and data to be provided to a general user in the related art will be described with reference to FIG. 3.

Figure 3:
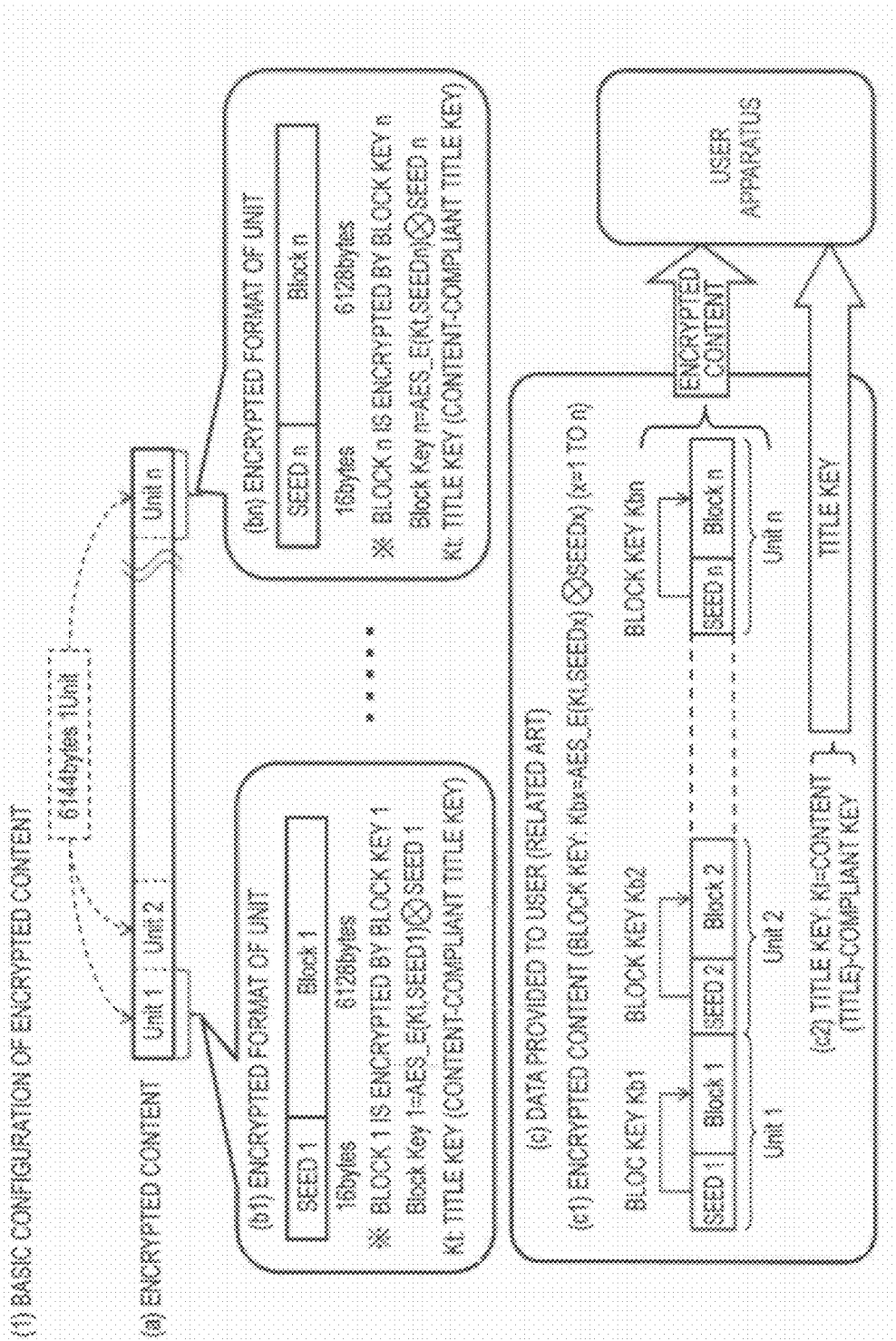
FIG. 3 is a diagram illustrating a basic configuration example of contents and data to be provided to a general user in the related art.

The configuration shown in FIG. 3 is a basic configuration example of an encrypted content based on the AACS (Advanced Access Content System) standard which is recorded on, for example, a Blu-ray (Registered Trademark) disc or the like. As described above, the AACS defines various standards for copyright protection of contents. As a representative encryption configuration based on the AACS standard, there is a configuration in which contents are divided in terms of units and different encryption keys are applied to the units. With the use of the encryption configuration, the control of the use of contents in terms of units is possible, and a variety of strict content control of the use is realized.

FIG. 3 shows the following data.
(a) encrypted content
(b) encryption format of each unit constituting encrypted content
(c) data to be provided to user (related art)

The (a) encrypted content of FIG. 3 is, for example, a content, such as a movie, and corresponds to a configuration of a content which is recorded in, for example, a BD (Blu-ray (Registered Trademark) disc).

As shown in (a) of FIG. 3, contents are divided in terms of units.

One unit has 6144-byte data.

(b) of FIG. 3 shows an encryption format in terms of units.

(b1) shows an encryption format for a unit 1 and (bn) shows an encryption format for a unit n.

The units 1 to n have the common configuration, that is, have the following.
16-byte seed (SEED)
6128-byte block data A seed is used as data for generating an encryption key, and a block is a data area which is encrypted by an encryption key generated by applying a seed.

Specifically, in each unit x (where x=1 to n), a block key (Kbx) which is an encryption key for a block is generated using a title key (Kt) which is a content-compliant encryption key and the seed (SEEDx) of each unit, and a block (Block_x) is encrypted by the generated block key (Kbx).

That is, in the example shown in the drawing, the blocks 1 to n of each of the n units 1 to n are encrypted by different block keys (Kb1 to Kbn) generated using different seeds 1 to n.

An encrypted content has the configuration shown in (c1) encrypted content of FIG. 3.

A block key (Kbx) is generated by the following arithmetic processing.

$$Kbx = (AES\_E(Kt, SEEDx))(XOR)(SEEDx)$$

In the above-described expression, $AES\_E(Kt, SEEDx)$ represents encryption processing (AES Encryption) of a seed x (SEEDx) by a title key, and (XOR) represents an exclusive OR operation.

That is, a block key in each unit is calculated by exclusive OR (XOR) of data $(AES\_E(Kt, SEEDx))$ obtained by encrypting the seed (SEEDx) of the unit x by the title key (Kt) and the seed (SEEDx).

The block (block x) of each unit is encrypted using the unit-compliant block key (Kbx) generated in the above-described manner.

An encrypted content which is constituted by multiple units having encrypted blocks having applied thereto different block keys in terms of units is provided to the user through a disc or a server.

(c) of FIG. 3 shows an example of data which is provided to the user. Data which is provided to the user includes the following data.
(c1) encrypted content
(c2) title key (Kt)

The (c1) encrypted content is an encrypted content which is generated in accordance with the above description and is data in which the encrypted blocks generated by the seeds and the title keys and having applied thereto the block keys are connected in terms of units.

The (c2) title key (Kt) is a content-compliant title key (Kt).

A general form for providing contents is heretofore made such that the (c1) encrypted content and the (c2) title key (Kt) are recorded in a disc or the like, or are provided from the server to the user.

When performing decryption processing of encrypted contents, the user generates the block keys in terms of units and the blocks of each unit are decrypted using the generated block keys. That is, the above-described block key generation expression is applied.

$$Kbx = (AES\_E(Kt, SEEDx))(XOR)(SEEDx)$$

With the application of the above-described expression, the block key x (Kbx) of each unit x is generated using the title key (Kt) and seed data (SEEDx) of each block, block decryption is performed in terms of units, and content reproduction is performed.

Seed data is provided to the user as unencrypted plaintext data.

However, as described above, when the (c1) encrypted content and the (c2) title key (Kt) are provided to the user, if the user thereafter reveals the title key (Kt), for example, a user who has unauthorized copy contents can decrypt copy contents, and the control of the use contents becomes impossible.

In particular, an individual puts various kinds of information on the network recently, and if the title key as one of those kinds of information is released, anyone can use the title key immediately. In this case, the control of the use of contents becomes impossible.

In order to prevent this situation, in the embodiment of the present disclosure, the configuration of data which is provided to the user is changed.

3. Configuration Example of Memory Card Serving as Content Recording Medium

Next, a configuration example of a memory card which is constituted by a flash memory or the like as the recording destination of contents will be described.

Figure 4:
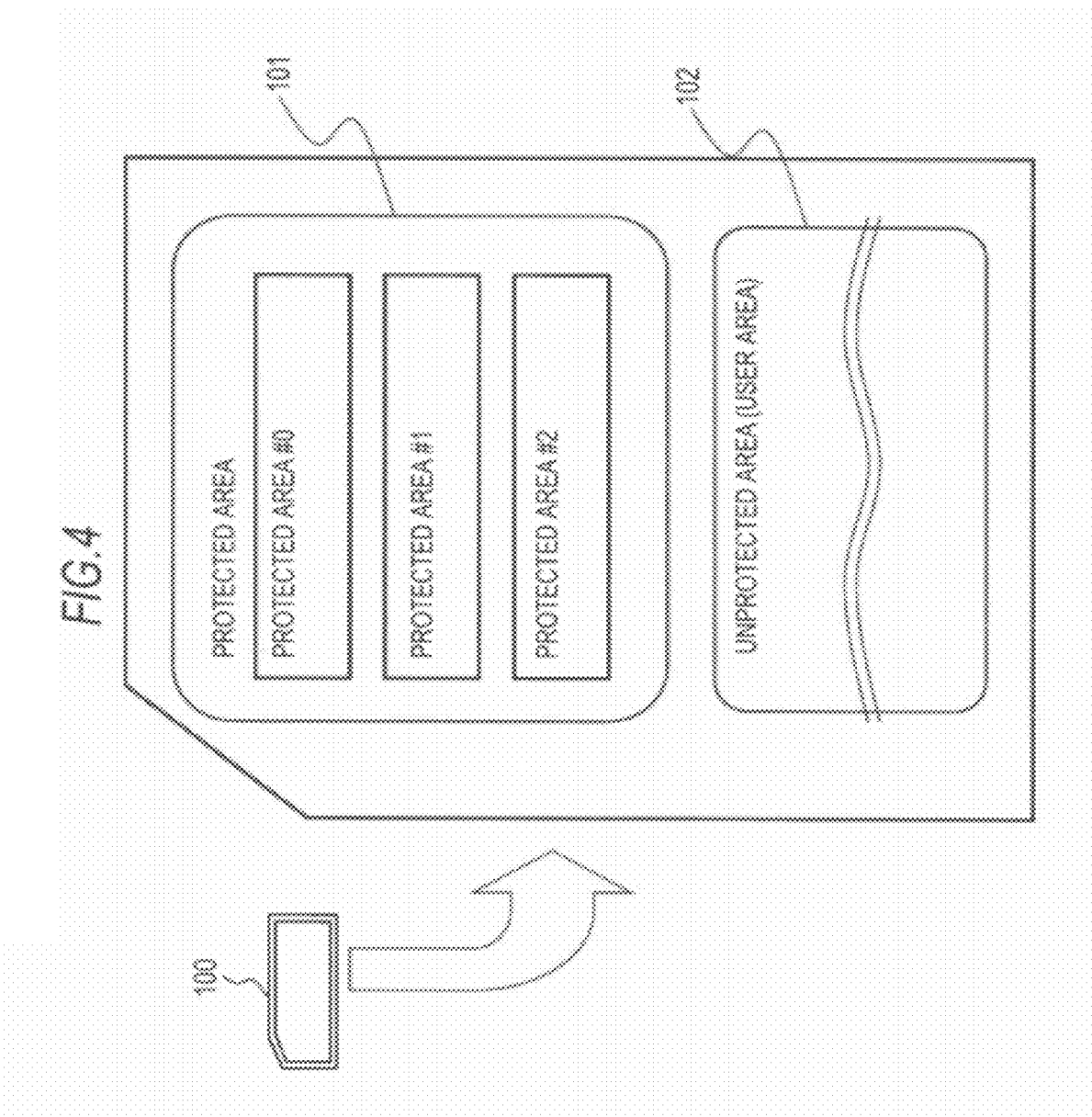
FIG. 4 is a diagram illustrating a specific configuration example of a storage area of a memory card.

FIG. 4 shows a specific configuration example of a storage area of a memory card 100.

As shown in FIG. 4, the storage area of the memory card 100 has the following two areas.

(a) protected area 101
(b) unprotected area (User Area) 102

The (b) unprotected area (User Area) 102 is an area where the recording/reproducing apparatus which is used by the user can freely access, and contents, general content management data, or the like is recorded. This area is an area where the user can freely write or read data.

The (a) protected area 101 is an area where free access is not permitted.

For example, when writing or reading data by a recording/reproducing apparatus or a reproducing apparatus which is used by the user or a server or the like which is connected via the network, the possibility of read or write in each apparatus is determined in accordance with a program stored in advance in the memory card 100.

The memory card 100 includes a data processing unit which executes a program stored in advance or an authentication processing unit which performs authentication processing. The memory card 100 first performs authentication processing with an apparatus which will write or read data with respect to the memory card 100.

During the authentication processing, an apparatus certificate (for example, a server certificate), such as a public key certificate, is received from another apparatus, that is, an access request apparatus, and it is determined whether or not access to each divided protected area of the protected area 101 using information described in the certificated. The determination processing is performed in terms of divided protected areas (the areas #0, #1, #2, . . . shown in the drawing) in the protected area 101 shown in FIG. 4, and only permitted processing in a permitted divided protected area is performed.

Figure 5:
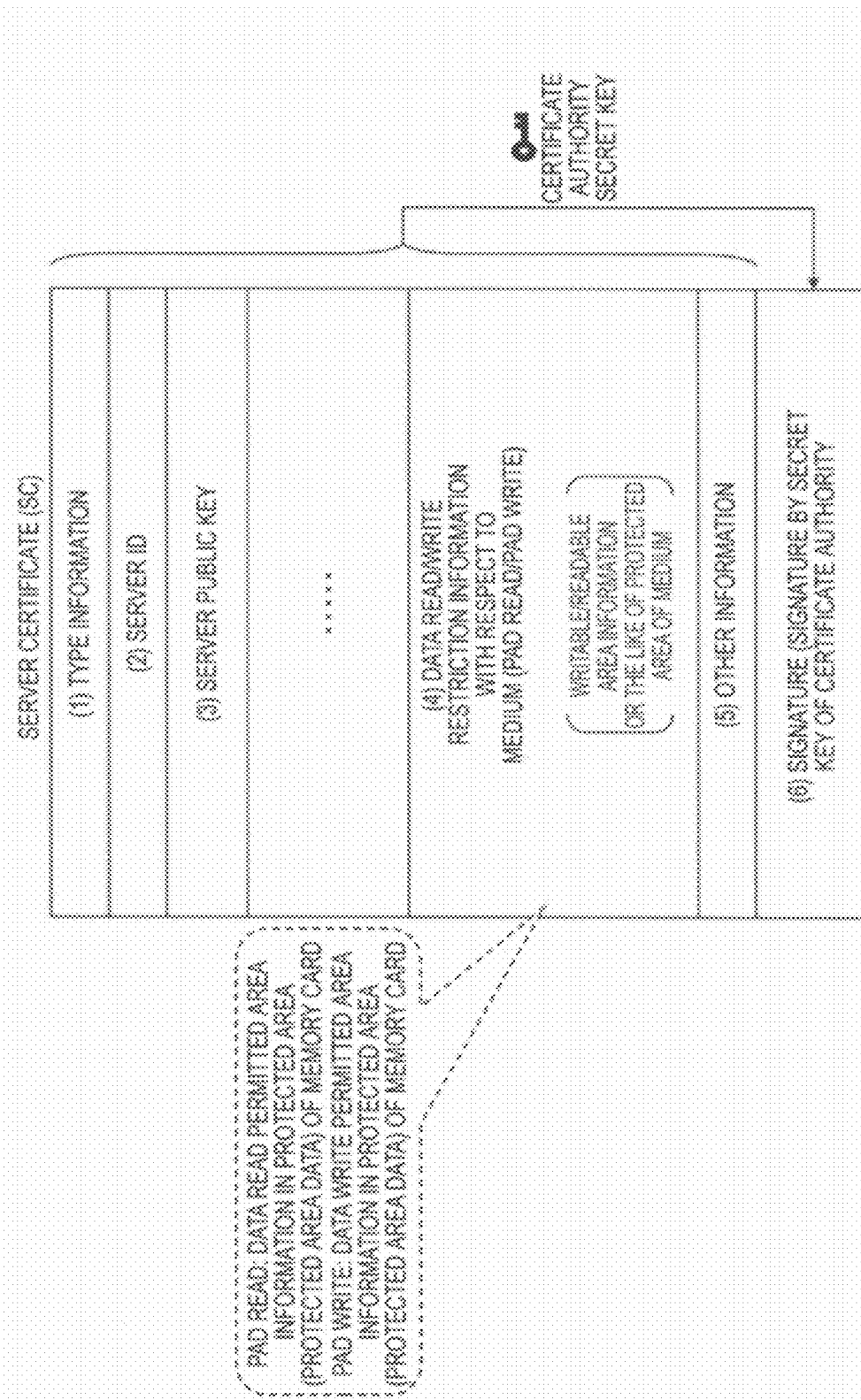
FIG. 5 is a diagram illustrating a data configuration example of a server certificate.

FIG. 5 shows a data example of a server certificate of a server which writes data in a memory card. FIG. 5 is a diagram showing a data configuration example of a server certificate which is provided to a server by a certificate authority.

The server certificate is the certificate of the server which is issued by the certificate authority with respect to the server in which content provision processing permitted, and the certificate which stores a server public key or the like. The server certificate has a signature which is set by a certificate authority secret key, and is constituted by data in which falsification is prevented.

As shown in FIG. 5, the server certificate includes the following data.

(1) type information
(2) server ID
(3) server public key
(4) read/write restriction information (PAD Read/PAD Write) with respect to medium
(5) other kinds of information
(6) signature The respective pieces of data of (1) to (6) will be described.

(1) type information

Type information is information which indicates the type of the certificate or the type of the content server, and records data indicating that the present certificate is the server certificate, or information indicating the type of the server, for example, whether the server is a server which provides music contents or a server which provides movie contents, or the like.

(2) server ID

The server ID is an area where the server ID is recorded as server identification information.

(3) server public key

The server public key is the public key of the server. The server public key and a server secret key which is provided to the server constitute a key pair based on a public key encryption method.

(4) read/write restriction information (PAD Read/PAD Write) with respect to medium Read/Write restriction information (PAD Read/PAD Write) with respect to a medium records information regarding a divided protected area, in which data read or write is permitted, in the protected area (PDA) 101 set in the storage area of the memory card 100 shown in FIG. 4.

The memory card performs permission determination processing of write or read in terms of the divided areas (the areas #0, #1, #2, . . . shown in the drawing) of the protected area 101 shown in FIG. 4 with reference to, for example, the recorded fields of the server certificate shown in FIG. 5 received from the server during the authentication processing, and permits only permitted processing in a permitted divided area.

As shown in FIG. 5, the server certificate records [(5) other kinds of information], in addition to the above-described data, and also records the (6) signature generated by the secret key of the certificate authority for the respective pieces of data of (1) to (5). The signature realizes a configuration for preventing falsification.

When the server certificate is used, signature verification is performed, and the server certificate is used after the validity is confirmed. The signature verification is performed using the public key of the certificate authority.

An apparatus, other than the server, which issues an access request to the protected area of the memory card, for example, a recording apparatus, a reproducing apparatus, or the like stores a host public key, holds a host certificate in which read/write restriction information (PAD Read/PAD Write) with respect to a medium shown in (4) of FIG. 5 is recorded, and presents the host certificate to the memory card.

The memory card performs signature verification of the certificate presented from the apparatus which issues an access request, after the validity of the certificate is confirmed, performs permission determination processing of write or read in terms of the divided protected areas (the areas #0, #1, #2, . . . shown in the drawing) in the protected area 101 shown in FIG. 4 with reference to the records of the read/write restriction information (PAD Read/PAD Write) in the certificate, and permits only permitted processing in the permitted divided protected area.

As described above, the read/write restriction information (PAD Read/PAD Write) with respect to the medium is set for each apparatus as an access target, for example, a content server or a recording/reproducing apparatus (host). This information is recorded in the server certificate or the host certificate corresponding to each apparatus.

The memory card 100 verifies data recorded in the server certificate or the host certificate in accordance with a specified program stored in advance in the memory card 100, and performs processing for permitting access to the only area where access permission is made.

A setting example of access restriction when an apparatus which requests access to a memory card is a server or host equipment, such as a recording/reproducing apparatus will be described with reference to FIG. 6.

Figure 6:
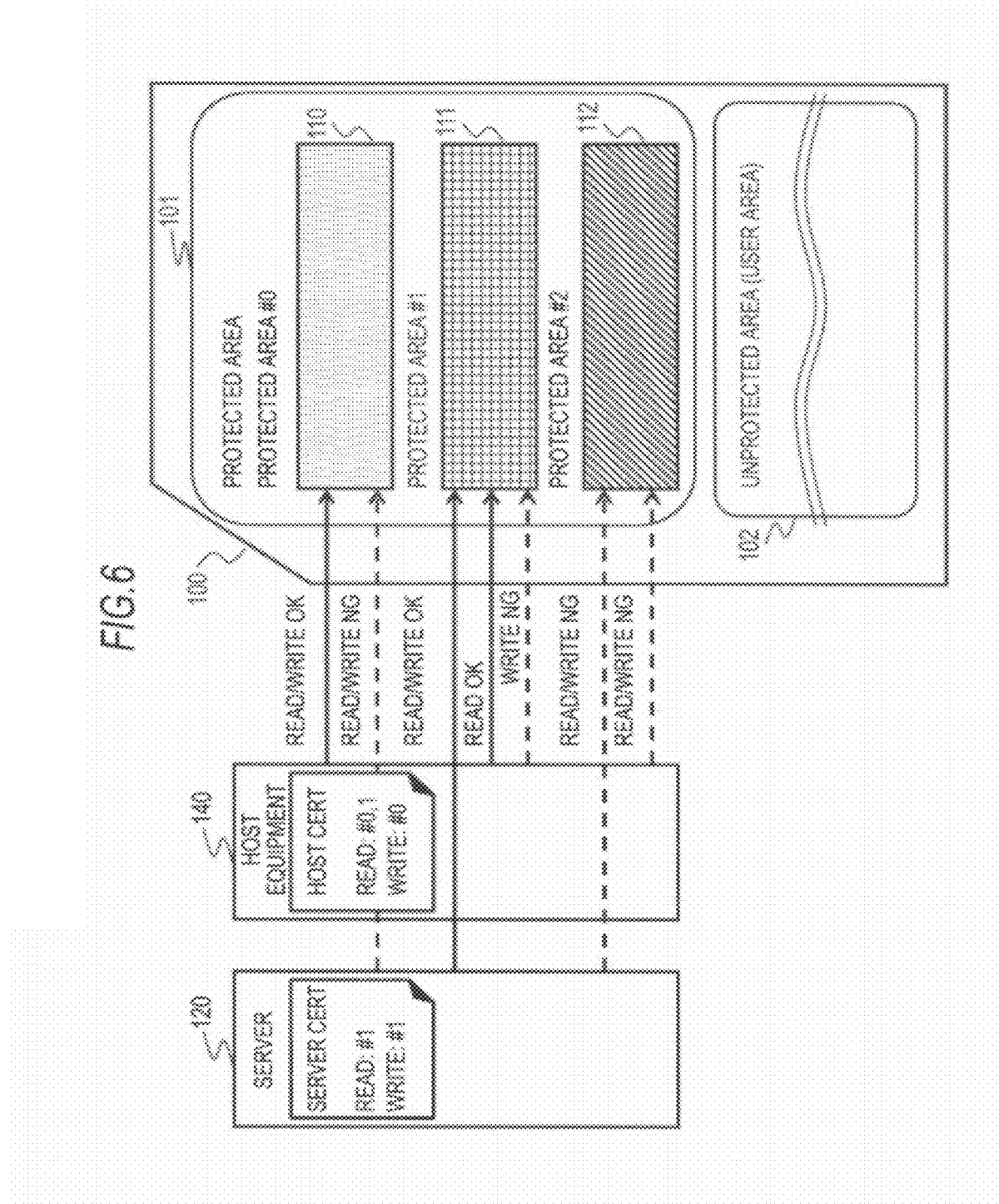
FIG. 6 is a diagram illustrating a specific example of access processing to a storage area of a memory card having applied thereto an apparatus certificate.

FIG. 6 shows a server 120 and host equipment 140 as an apparatus which requests access to a memory card, and a memory card 100 from the left.

The server 120 is a server which performs, for example, content provision processing or processing for writing an encryption key to be applied to content decryption.

The host equipment 140 is an apparatus which performs processing for reproducing contents stored in the memory card 100, and should acquire an encryption key recorded in the memory card for content decryption processing.

The memory card 100 has a protected area 101 and an unprotected area (User Area) 102. An encrypted content or the like is recorded in the unprotected area (User Area) 102.

An encryption key which is applied for decrypting encrypted contents is recorded in the protected area 101. The encryption key recorded in the protected area 101 includes individual keys (Kind) which are different in terms of content recording processing. The use processing of the individual key (Kind) will be described below in detail.

As described above with reference to FIG. 4, the protected area 101 is divided into multiple areas.

In the example shown in FIG. 6, there are the following three protected areas.

protected area #0 110
protected area #1 111
protected area #2 112

The memory card 100 receives the apparatus certificate (for example, the server certificate), such as the public key certificate, from another apparatus, that is, an access request apparatus during the authentication processing with the access request apparatus, and determines whether or not access to each protected area of the protected area 101 is permitted using information described in the certificate. As a result of the determination processing, only permitted processing in a permitted protected area is performed.

For example, write permitted area information (PAD Write) which is recorded in the server certificate of the server is constituted as a certificate in which write permission to the protected area #1 111 is set. That is, as shown in the drawing, the following setting is made.

read permitted area: #1
write permitted area: #1

In the example shown in the drawing, a setting is made such that read is also permitted with respect to a protected area where write is permitted.

For example, the host certificate which is held by the host equipment 140 serving as a reproducing apparatus, which reads an encryption key recorded in the protected area #1 111 and performs content reproduction is constituted as a certificate in which only read permission to the protected area #1 111 is set. That is, as shown in the drawing, the following setting is made.

read permitted area: #0, #1 write permitted area: #0

In the host certificate, write permission to the protected area #1 111 is not set.

However, since a setting is made such that, at the time of content deletion, an encryption key corresponding to the deleted content can be deleted, deletion processing may be permitted.

The protected area #2 112 is set as an area where access is not permitted for both the server and the host, that is, an external access inhibited area.

That is, only when data processing in the memory card 100 is performed, the protected area #2 112 is set as an area where a data processing unit of the memory card 100 accesses (data write and read).

As described above, the data processing unit of the memory card determines whether or not to permit data write and data read from the access request apparatus with respect to the protected area 101 on the basis of the apparatus certificate.

4. Example of Content Provision Processing to Client (User) According to an Embodiment of the Present Disclosure The configuration of contents which are provided to the user according to an embodiment of the present disclosure and a content provision sequence will be described with reference to FIG. 7 and later.

Figure 7:
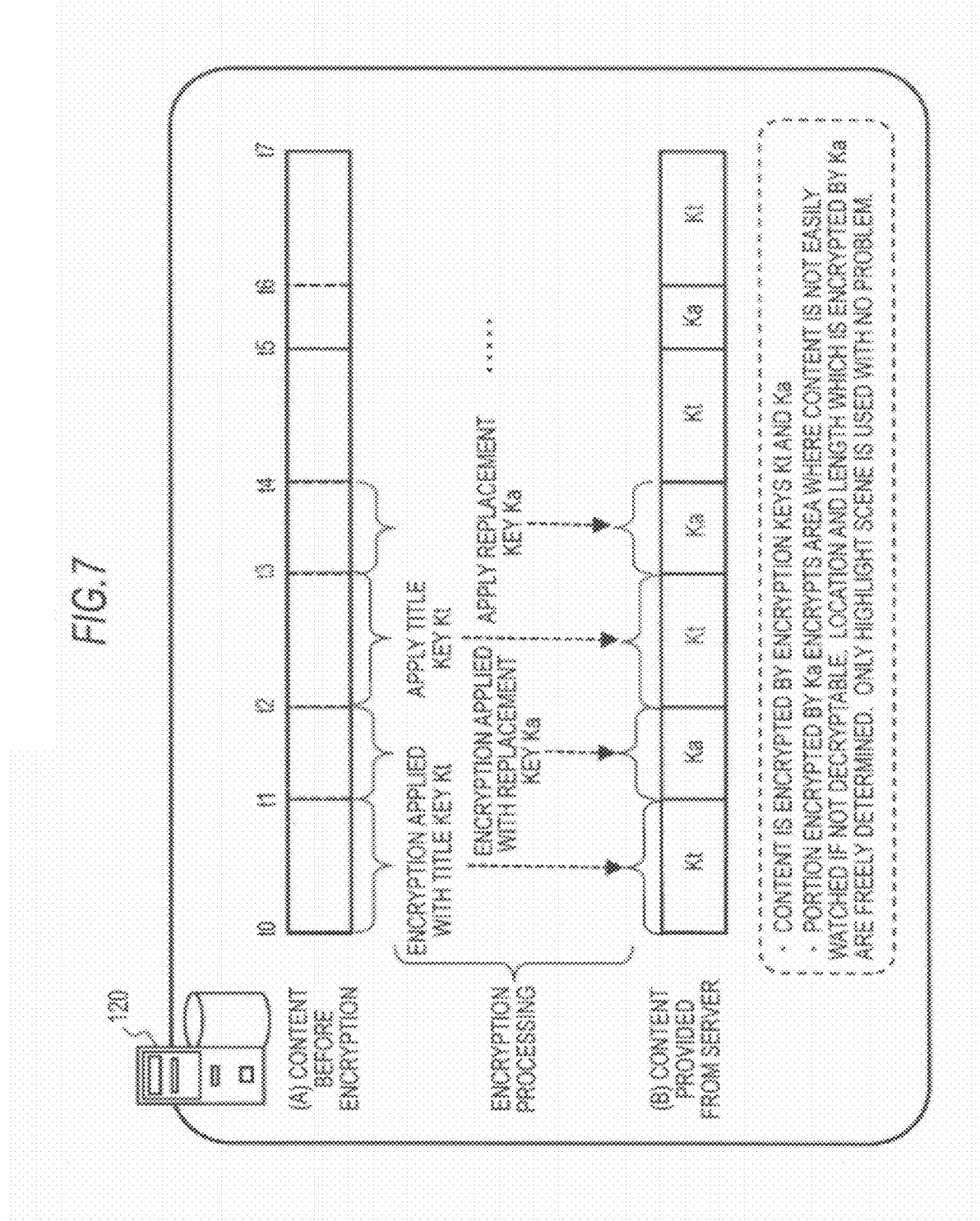
FIG. 7 is a diagram, illustrating a configuration example of contents to be provided from a server according to an embodiment of the present disclosure.

FIG. 7 is a diagram illustrating a data configuration example of contents which are provided to a client serving as a user apparatus by the server 120.

FIG. 7 shows the following contents.

(A) content before encryption
(B) content to be provided from server

The content which is provided to the client is [(B) content to be provided from server].

The server 120 performs predetermined encryption processing on [(A) content before encryption] as a plaintext content to generate [(B) content to be provided from server].

[(B) content to be provided from server] has a configuration in which the following two encrypted areas are mixed.

encrypted area having applied thereto title key Kt
encrypted area having applied thereto replacement key Ka The server 120 performs encryption processing having applied thereto the title key Kt in terms of predetermined areas and encryption processing having applied thereto the replacement key Ka on [(A) content before encryption] as a plaintext content to generate [(B) content to be provided from server].

The encryption processing having applied thereto the title key is performed, for example, as the same encryption processing as described above with reference to FIG. 3. The encryption processing having applied thereto the replacement key Ka is performed as the encryption processing described with reference to FIG. 3 while applying the replacement key Ka, instead of the title key.

The server provides an encrypted content, in which two encrypted areas having applied thereto two different keys including the encrypted area having applied thereto the title key Kt and the encrypted area having applied thereto the replacement key Ka shown in (B) of FIG. 7 are mixed, to the client.

On the client side, there is no case where an encrypted content in [(B) content to be provided from server] is recorded in the memory card as it is.

The data processing unit of the memory card decrypts the encrypted area having applied thereto the replacement key Ka included in [(B) content to be provided from server] and performs processing for replacing the encrypted area with encrypted data by the individual key Kind separately described to record encrypted data in the memory card. This processing will be described below.

The classification of the encrypted area having applied thereto the title key Kt and the encrypted area having applied thereto the replacement key Ka in [(B) content to be provided from server] of FIG. 7 can be freely set. As an example, it is preferable that an area which is encrypted by the replacement key Ka is set to include an important scene (highlight scene) of the content.

For example, in the case of a content which is set as MPEG data, it is preferable that an area which is encrypted by the replacement key Ka is set to includes an I picture as important data in MPEG data or a part of the I picture.

Next, a content provision sequence from the server 120 to the client will be described with reference to FIG. 8.

Figure 8:
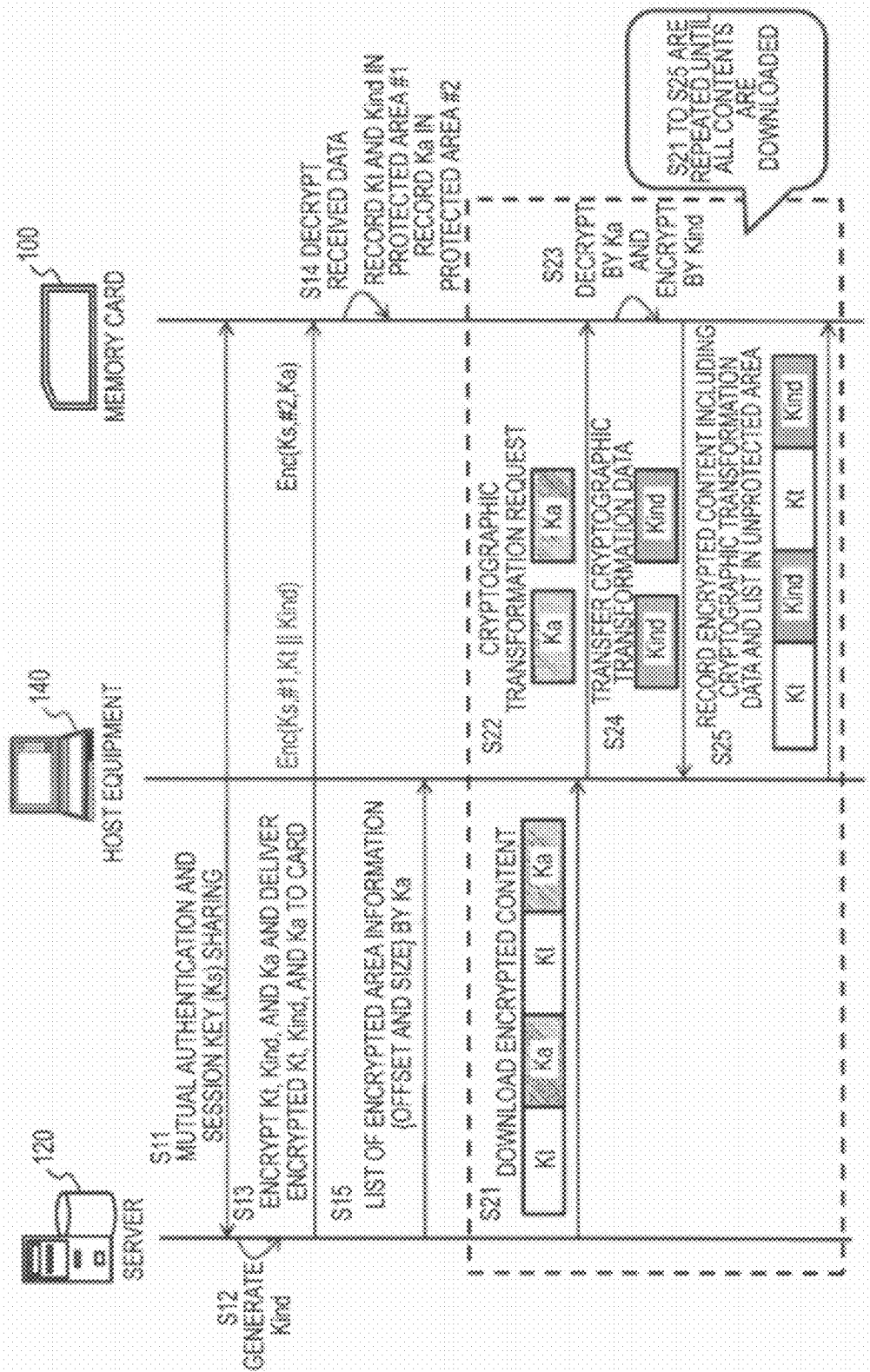
FIG. 8 is a diagram illustrating a content provision sequence from a server according to an embodiment of the present disclosure.

FIG. 8 shows the following from the left.

(1) the server 120 which performs content provision processing (2) the host equipment 140 which receives a content provided from the server 120 and records the content in the memory card 100

(3) the memory card 100 which is loaded in the host equipment 140 and records an encrypted content or key data The host equipment 140 and the memory card 100 also have a data processing unit which includes a processor capable of performing data processing including authentication processing and encryption processing, or a communication unit.

The server 120 stores the encrypted content shown in (B) of FIG. 7, that is, the content, in which the following two encrypted areas are mixed, in a database, and also holds the title key Kt and the replacement key Ka in the database.

encrypted area having applied thereto title key Kt encrypted area having applied thereto replacement key Ka The content provision sequence from the server 120 to the client will be described with reference to a sequence diagram of FIG. 8.

First, in Step S11, mutual authentication processing and sharing processing of a session key serving as a shared secret key are performed between the server 120 and the memory card 100 loaded in the host equipment 140.

For example, the mutual authentication processing which includes replacement processing of both public key certificates or the like is performed in accordance with, for example, the public key encryption method. The server 120 holds the server certificate which stores the public key issued by the certificate authority and the secret key. The memory card 100 also receives a pair of the public key certificate and the secret key in advance from the certificate authority and stores the public key certificate and the secret key in its storage unit.

The memory card has a data processing unit which stores a program for performing the mutual authentication processing or determining accessibility to the protected area described above with reference to FIG. 4 and the like, and executes the program.

If mutual authentication between the content server 120 and the memory card 100 is established, and the validity of both of them is confirmed, the server 120 provides various kinds of data to the memory card 100. When mutual authentication is not established, the data provision processing from the server 120 is not performed.

After mutual authentication is established, in Step S12, the server 120 generates the individual keys Kind.

The individual keys Kind are individual keys in terms of content distribution which are generated in terms of content distribution processing, and correspond to the clients. When the same content is distributed to multiple clients, the individual keys Kind are set as different keys.

In Step S12, the generation of the individual keys Kind by the server is performed using, for example, a random number generation device, and individual keys having new data configurations are sequentially generated.

In Step S13, the server 120 transmits the following three generated keys to the memory card 100.

individual key Kind two keys which are applied as the encryption key of the encrypted content described with reference to (B) of FIG. 7, that is, title key: Kt replacement key: Ka At the time of transmission, key data is encrypted by the session key: Ks and transmitted. That is, the following data is transmitted.

$Enc(Ks, Kt\|Kind), Enc(Ks, Ka)$

Enc(a,b) represents data when data b is encrypted by a key a.

(a∥b) means connection data of data a and b.

In Step S14, the memory card 100 applies the session key: Ks to decrypt the following data received from the server 120.

$Enc(Ks, Kt\|Kind), Enc(Ks, Ka)$

Three pieces of key data obtained by decryption are stored in the protected areas of the memory card 100.

The title key: Kt and the individual key: Kind are recorded in the protected area where access of the host equipment 140 is permitted, in this embodiment, in the protected area #1.

Only the replacement key: Ka is recorded in the protected area where access from an external apparatus including the host equipment is not permitted, in this embodiment, in the protected area #2.

Figure 9:
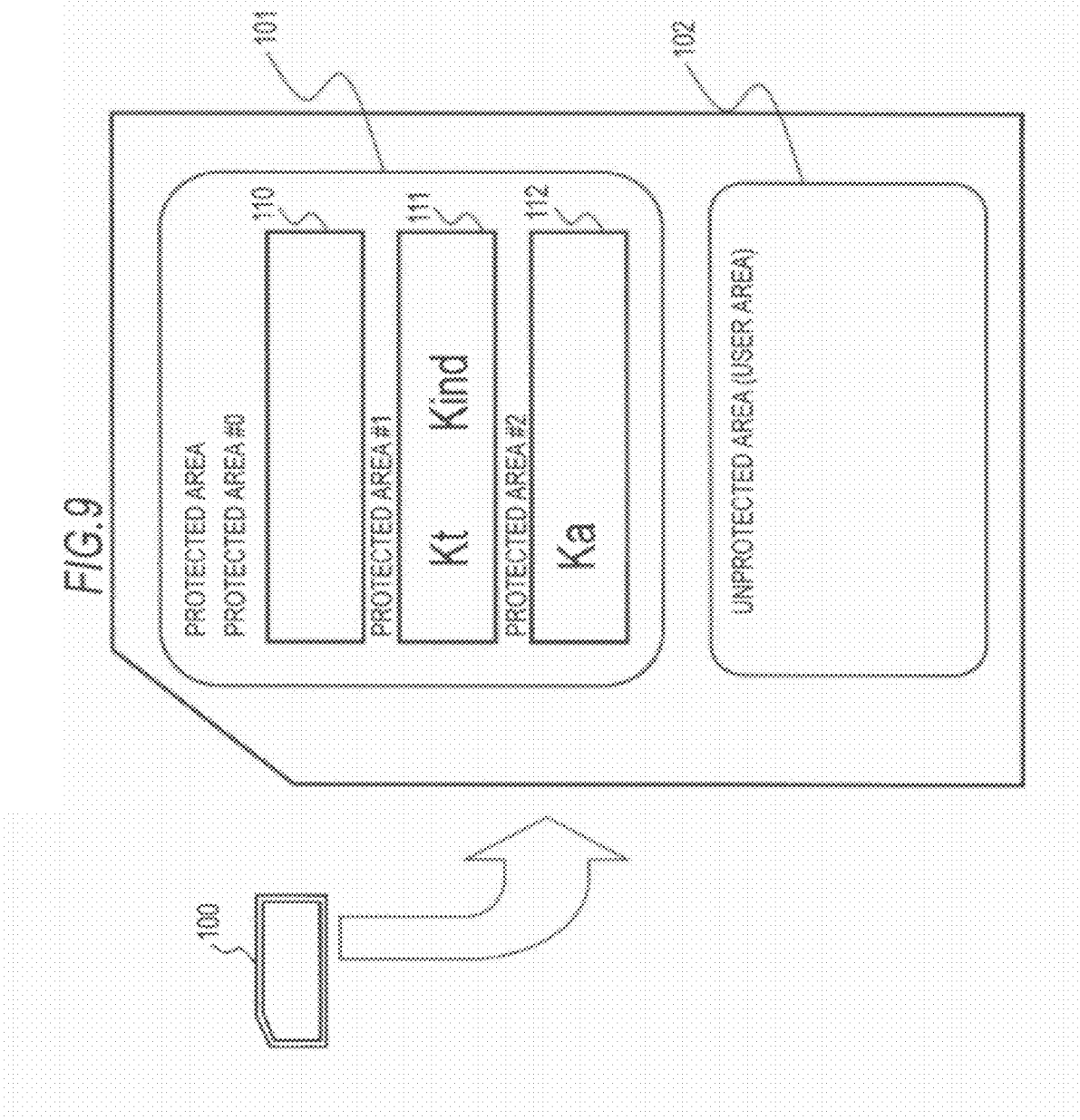
FIG. 9 is a diagram illustrating a storage example of key data in a memory card serving as a recording medium according to an embodiment of the present disclosure.

FIG. 9 shows a storage example of key data in the memory card 100.

As shown in FIG. 9, the title key: Kt and the individual key: Kind are recorded in the protected area #1 111 which is an access permitted area from the host equipment 140 set in the protected area 101 of the memory card 100.

The replacement key: Ka is recorded in the protected area #2 112, in which access from an external apparatus including the host equipment 140 is not permitted, set in the protected area 101 of the memory card 100.

Returning to FIG. 8, the description of the content provision sequence will be continued.

In Step S15, the server 120 provides to the host equipment 140 information regarding the area having applied thereto the replacement key Ka in the encrypted content in which the encrypted areas of the title key and the replacement key Ka shown in (B) of FIG. 7 are mixed.

Specifically, a list of information (1) and (2) for each Ka application area in the content shown in (B) of FIG. 7 is provided to the host equipment 140 as replacement key application area information.

(1) offset information from the head of the content (2) size of each Ka application area In Step S21, the server 120 provides to the host equipment 140 the encrypted content in which the encrypted areas of the title key and the replacement key Ka shown in (B) of FIG. 7 are mixed.

In Step S22, the host equipment 140 selects only replacement key application area data (the encrypted content by the replacement key: Ka) from the received encrypted content, that is, the encrypted content, in which the encrypted areas of the title key and the replacement key Ka shown in (B) of FIG. 7 are mixed, with reference to the replacement key application area information (list), and transmits replacement key application area data to the memory card 100.

On an assumption that the processing of Step S22 starts, the mutual authentication processing between the host equipment 140 and the memory card 100 is performed, and the validity of both equipments is confirmed. That is, it is premised on the establishment of mutual authentication. When mutual authentication is not established, the processing of Step S22 and later is not performed.

In Step S23, the memory card 100 performs processing for applying the replacement key: Ka recorded in the protected area #2 112 to decrypt the replacement key application area data (the encrypted content by the replacement key: Ka)

received from the host equipment 140 and applying the individual key: Kind recorded in the protected area #1 111 to perform encryption.

That is, key replacement processing is performed.

In Step S24, the memory card 100 provides data encrypted by the individual key: Kind to the host equipment 140.

In Step S25, the host equipment 140 places encrypted data by the individual key: Kind received from the memory card 100 at the original content position, that is, at the set position of encrypted data by the replacement key: Ka.

That is, the encrypted content which has the encrypted area by the title key: Kt and the encrypted area by the individual key: Kind is generated and recorded in an unprotected area of the memory card 100. The replacement key application area information (list) is also recorded in an unprotected area of the memory card 100.

The processing of Steps S21 to S25 is repeatedly performed until content download from the server 120 ends.

Figure 10:
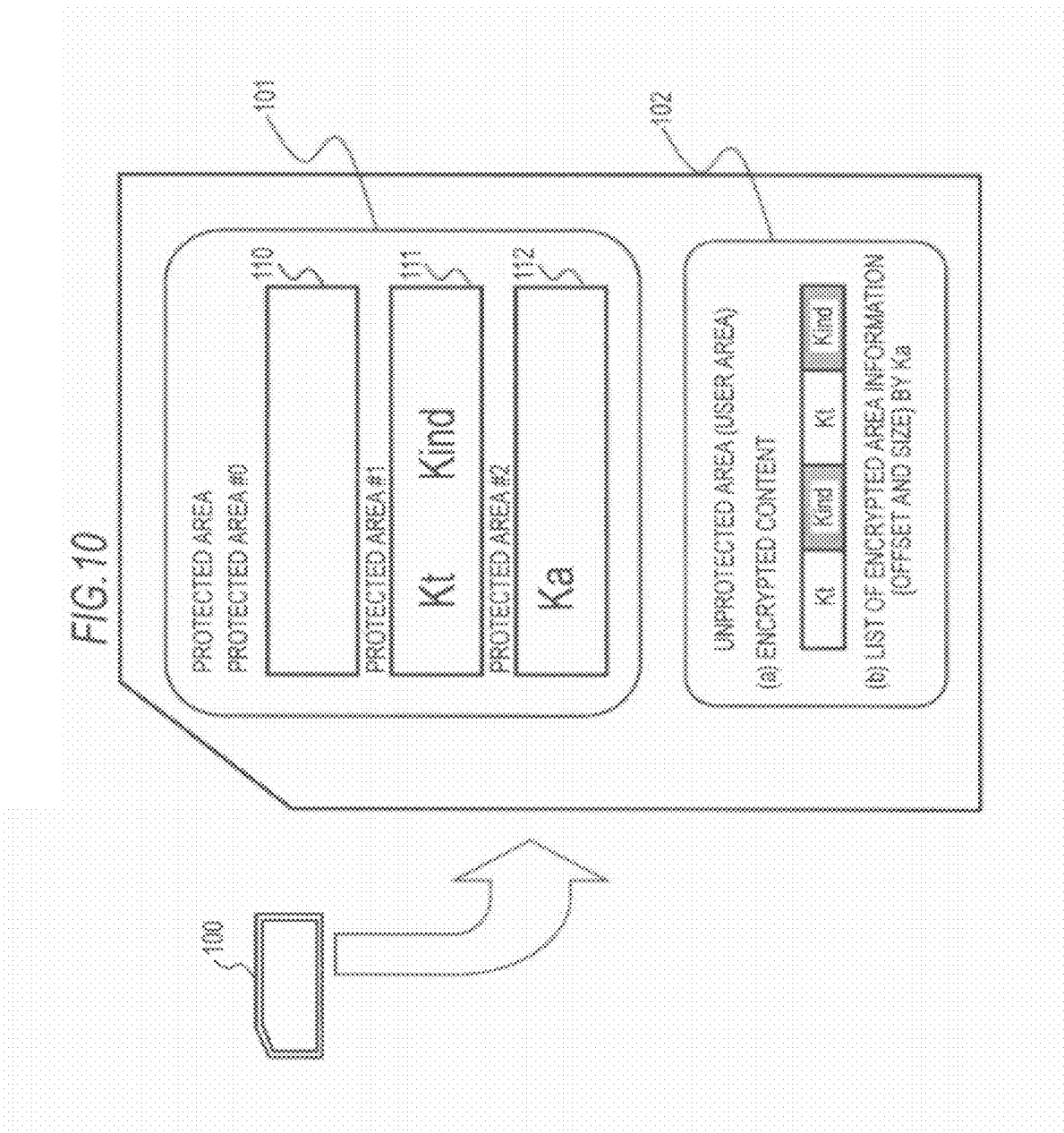
FIG. 10 is a diagram illustrating a data storage example of key data, contents, or the like in a memory card serving as a recording medium according to an embodiment of the present disclosure.

FIG. 10 shows an example of data which is recorded in the memory card 100 as the processing result. As shown in FIG. 10, the following data is recorded in the memory card 100.

(a) title key: Kt and individual key: Kind

These pieces of key data are recorded in the protected area #1 111 which is an access permitted area from the host equipment 140 set in the protected area 101 of the memory card 100.

(b) replacement key: Ka

This key data is recorded in the protected area #2 112 in which access from an external apparatus including the host equipment 140 is not permitted, set in the protected area 101 of the memory card 100.

(c) The encrypted content (the content in which encrypted data by the title key: Kt and encrypted data by the individual key: Kind are mixed) is recorded in an unprotected area where access from an external apparatus is possible.

(d) A list (a list having the offset and data size for area identification) which is area information of the encrypted area by the replacement key: Ka (=the encrypted area by the individual key: Kind) is recorded in an unprotected area where access from an external apparatus is possible.

As shown in FIG. 10, these pieces of data are respectively recorded in the areas of the memory card 100.

A processing sequence which is performed between the host equipment 140 and the memory card 100 at the time of the content recording processing described with reference to the sequence diagram of FIG. 8 will be described with reference to FIG. 11.

Figure 11:
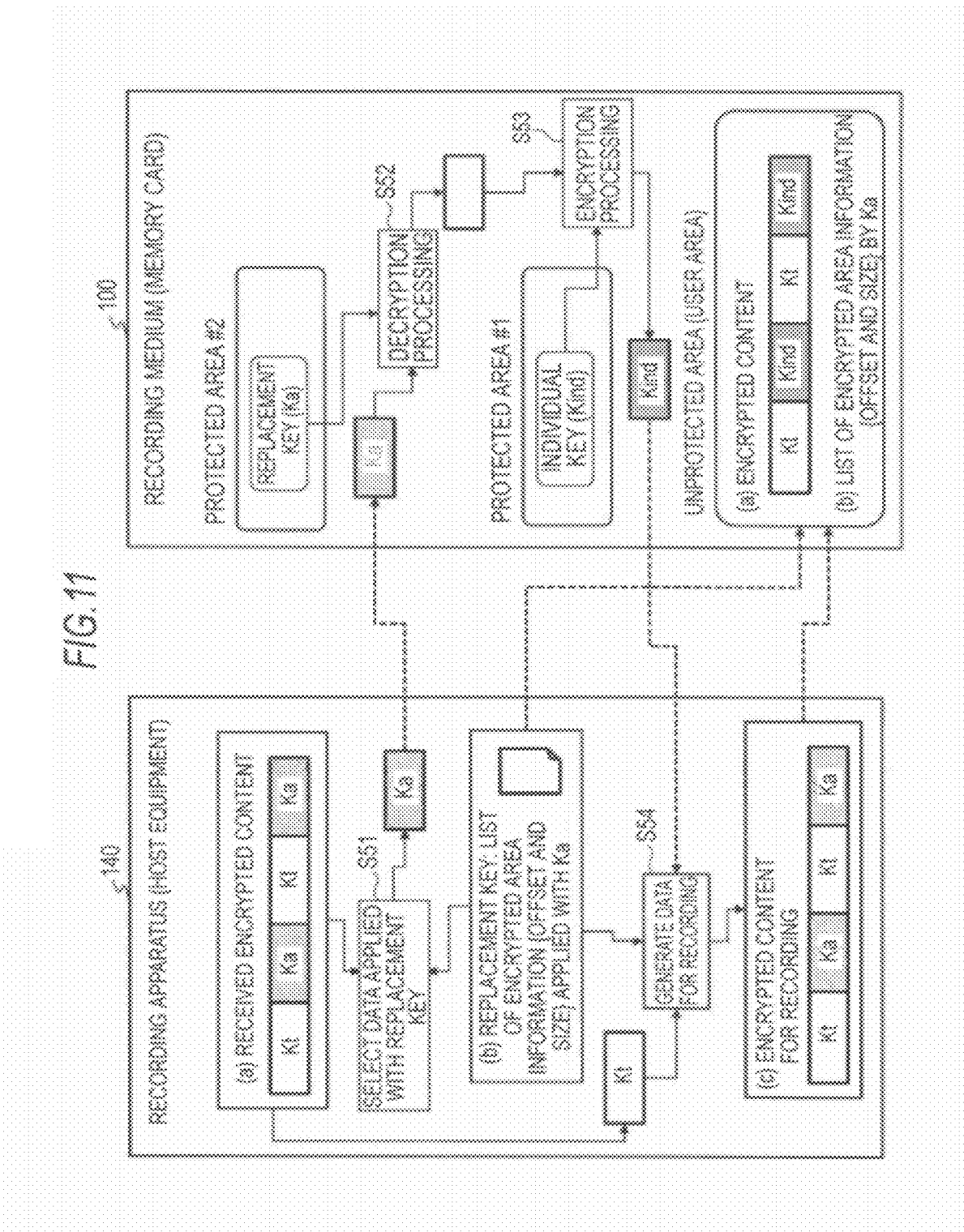
FIG. 11 is a diagram illustrating a key replacement processing sequence in content storage processing according to an embodiment of the present disclosure.

FIG. 11 is a diagram illustrating a detailed sequence of key replacement processing. That is, the key replacement processing is processing for replacing only an area having applied thereto the replacement key Ka in a content encrypted by two keys of the title key Kt and the replacement key Ka received from the server 120 with encrypted data of the individual key Kind.

It is assumed that key data (title key: Kt, replacement key: Ka, and individual key: Kind) has been provided from the server 120 to the memory card 100 and stored in the protected areas of the memory card.

It is assumed that an encrypted content which is encrypted in terms of areas by applying two keys of the title key: Kt and the replacement key: Ka, and replacement key application area information (list of offset and data size) indicating a replacement key application area have been received from the server 120 to the host equipment 140.

First, in Step S51, the host equipment 140 selects and acquires encrypted data by the replacement key Ka in the encrypted content received from the server 120 using the replacement key application area information (list of offset and data size) received from the server 120, and provides selected data to the memory card 100.

In Step S52, the memory card 100 performs decryption processing of encrypted data by the replacement key Ka received from the host equipment 140.

That is, the data processing unit of the memory card 100 acquires the replacement key: Ka recorded in the protected area #2 where access from all external apparatuses are inhibited, and performs decryption by applying the replacement key: Ka.

Next, in Step S53, the data processing unit of the memory card 100 performs encryption processing having applied thereto the individual key: Kind on decrypted data.

That is, the data processing unit of the memory card 100 acquires the individual key: Kind recorded in the protected area #1 and performs encryption processing having applied thereto the individual key: Kind.

The protected area #1 is set as an area where access of some external apparatuses, for example, a reproducing apparatus (host equipment) or the like, in which mutual authentication with the memory card is established, is permitted.

Data which is subjected to key replacement through the encryption processing having applied thereto the individual key: Kind in the memory card 100 is transmitted to the host equipment 140.

In Step S54, the host equipment 140 places encrypted data by the individual key: Kind received from the memory card 100 at the original content position, that is, the set position of encrypted data by the replacement key: Ka.

Thereafter, the host equipment 140 records the encrypted content which has the encrypted area by the title key: Kt and the encrypted area by the individual key: Kind and the replacement key application area information (list) [=individual key application area information] in the unprotected area of the memory card 100.

As a result, the respective pieces of data described with reference to FIG. 10 are respectively recorded in the areas of the memory card 100.

A setting example of data which is provided to each client by the server 120 will be described with reference to FIG. 12.

Figure 12:
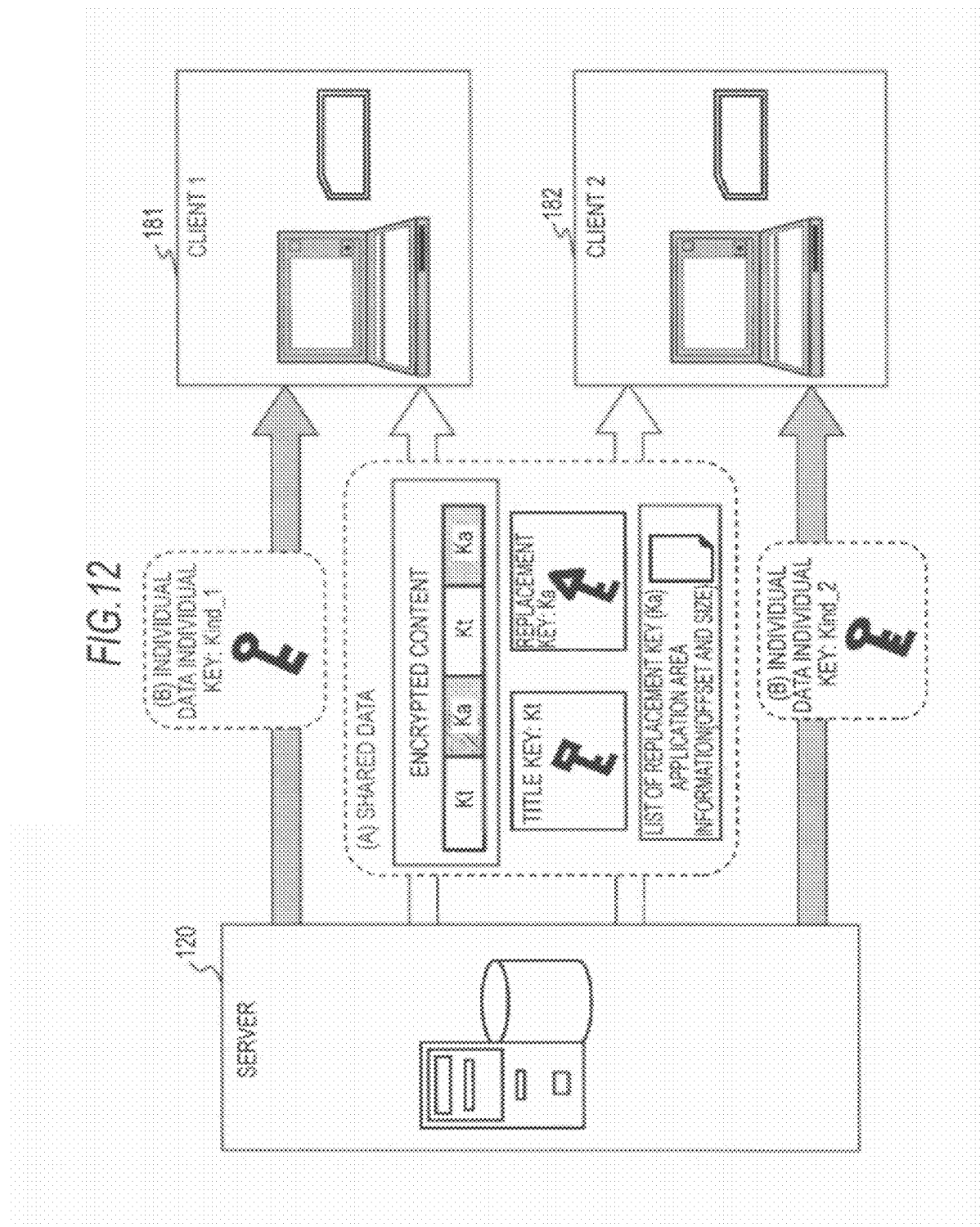
FIG. 12 is a diagram illustrating a configuration example of data which is provided from a server to a client.

As shown in FIG. 12, the server 120 respectively provides the following data to clients 181 and 182.

(A) shared data (B) individual data

Although FIG. 12 shows only two clients 1 and 2 181 and 182, there are more clients. Shared data is data which is set as shared data for all the clients, and individual data is data which differs between the clients.

(A) Shared data includes the following data.

(a1) encrypted content (content in which encrypted data by title key: Kt and encrypted data by individual key: Kind are mixed)

(a2) title key: Kt (a3) replacement key: Ka (a4) encrypted area information by replacement key: Ka (for example, list including offset and data size for area identification)

The following data is provided to the clients as different (B) individual data.

(b1) individual key: Kind

Even when the same content having applied thereto the same title key: Kt and replacement key: Ka is provided to multiple clients 1, 2, . . . different encrypted contents which are encrypted by the title key: Kt and the individual keys: Kind different between the clients are recorded in the recording medium of the clients 1, 2, . . . .

Therefore, for example, even when the title key is released and can be used by an unspecified number of users, the individual keys are different in terms of clients (in terms of distributed contents), and the unauthorized use of contents does not become spread if individual data may not be used by an unspecified number of people.

The individual keys are managed by the server along with distribution destination information. Thus, when an individual key or an encryption seed which has illegally spread is found, it becomes possible to specify the distribution destination of the individual key.

FIG. 13 shows a data configuration example of management information which is held in a storage unit of a server.

As shown in FIG. 13, the management information includes the following information.
- unique ID corresponding to distributed content
- distributed content information
- individual key (Kind) information
- distribution destination information
- distribution user information
- distribution date-and-time information As the distribution destination information, the host equipment 140 and the memory card (recording medium) 100 may be registered separately. One of them may be registered.

With regard to the individual key (Kind) information, different data is recorded for all entries. When a user of a distribution destination is identical, the same individual key may be used. In this case, the individual keys are set as keys which are different in terms of distribution destination users, not in terms of distribution processing.

In this case, when unauthorized data is released, it becomes possible to specify a user as a release source through comparison of the individual keys.

The example of management information shown in FIG. 13 is just an example, and all kinds of information may not be used. Information other than these kinds of information may be held as management information.

As described above, with the configuration according to the embodiment of the present disclosure, the server which performs the content distribution processing provides the encrypted content which has the encrypted areas by the title key: Kt and the replacement key: Ka, as shared data for the clients, and generates different individual keys (Kind) in terms of content distribution and provides the individual keys to the memory card serving as the data storage device.

On the memory card side, the encrypted area by the replacement key: Ka in the encrypted content is replaced with encrypted data by the individual key: Kind, and then stored in the memory card.

With this setting, the following two keys should be used for decryption processing of encrypted contents stored in the memory card.
- title key: Kt
- individual key: Kind That is, even when the title key: Kt is released, complete decryption of contents becomes impossible.

When both the title key: Kt and the individual key: Kind are released, it becomes possible to specify a client as a release source on the basis of management data shown in FIG. 13.

Next, a content and key provision processing sequence in the server 120 will be described with reference to a flowchart of FIG. 14.

In Step S201, an encrypted content which has encrypted areas of two types of keys (title key and replacement key) is generated or acquired. This encrypted content is the encrypted content described above with reference to (B) of FIG. 7.

Next, in Step S202, the individual key: Kind unique to a client as a content distribution processing target is generated.

Next, in Step S203, the individual key: Kind, the title key: Kt, and the replacement key: Ka are transmitted to a recording medium (memory card). As the premise of the data transmission processing, mutual authentication between the server and the recording medium (memory card) is established, and the session key: Ks is shared.

Transmission key data is transmitted as encrypted data having applied thereto the session key: Ks.

Next, in Step S204, the encrypted content which has the encrypted areas of two types of keys (title key and replacement key) is transmitted to a recording apparatus (host equipment).

Next, in Step S205, management data in which an individual key and a client (recording apparatus/recording medium) which provides contents are associated with each other is generated and registered in the database of the server 120.

5. Content Reproduction Processing in Client According to an Embodiment of the Present Disclosure Next, a reproduction sequence of an encrypted content stored in a memory card, that is, an encrypted content which is set as mixed data of encrypted data by the title key: Kt and the individual key: Kind will be described with reference to a sequence diagram of FIG. 15.

FIG. 15 shows the following from the left.
(1) a memory card 100 which is loaded in a host equipment 140 performing content reproduction processing and stores encrypted contents or key data
(2) a host equipment 140 which performs the content reproduction processing The memory card 100 serving as a recording medium corresponds to the memory card 100 described with reference to FIGS. 4, 6, and the like, and has a protected area where access restriction is made in accordance with equipment and an unprotected area (User Area) where there is no access restriction.

A reproducing apparatus which performs content reproduction processing is the same apparatus as the host equipment 140 which performs content recording processing in the above description with reference to the sequence diagram of FIG. 8 or an apparatus different from the host equipment 140, for example, an apparatus exclusive for reproduction processing. However, a reproducing apparatus should read data of the memory card 110 serving as a recording apparatus which records contents.

In the sequence diagram of FIG. 15, description will be provided assuming that an apparatus which performs content reproduction is the same host equipment 140 as a recording apparatus.

The processing of each step in the sequence diagram of FIG. 15 will be described.

In Step S301, mutual authentication processing and sharing processing of the session key: Ks are performed between the memory card 100 having recorded therein contents and the host equipment 140 which performs content reproduction.

This processing is the same as the mutual authentication and key sharing processing between the server 120 and the memory card 100 described above as the processing of Step S11 of FIG. 8.

For example, the mutual authentication processing which includes replacement processing of both public key certificates is performed in accordance with the public key encryption method. The host equipment 140 holds a host certificate which stores a public key having the same data configuration as the server certificate described above with reference to FIG. 5 issued by the certificate authority, and a secret key. The memory card 100 also receives a pair of the public key certificate and the secret key from the certificate authority and stores the public key certificate and the secret key in its storage unit.

The memory card has a data processing unit which stores a program for performing the mutual authentication processing or determining accessibility to the protected area described above with reference to FIG. 4 and the like, and executes the program.

If mutual authentication between the memory card 100 and the host equipment 140 is established, and the validity of both equipments is confirmed, the process progresses to Step S302. When mutual authentication is not established, the processing of Step S302 and later is not performed.

In Step S302, the host equipment 140 outputs a request to read the title key: Kt and the individual key: Kind stored in the protected area #1 to the memory card 100.

As described with reference to FIG. 6, the protected area #1 of the memory card 100 is an area where access by the host equipment 140 is permitted.

In Step S303, the memory card 100 performs processing for confirming the access rights of the host equipment 140 to the protected area #1. As described above with reference to FIG. 6, the host certificate which is held in the host equipment 140 serving as a reproducing apparatus performing content reproduction is constituted as a certificate in which only read permission to the protected area #1 is set. As shown in FIG. 6, the following setting is made.

read permitted area: #0, #1
write permitted area: #0

The memory card 100 confirms that the host equipment 140 is an apparatus which has access rights to the protected area #1 on the basis of the host certificate acquired through the mutual authentication processing.

When the access rights are not confirmed, the processing of Step S304 and later is not performed.

In Step S303, when it is confirmed that the host equipment 140 is an apparatus which has access rights to the protected area #1, the process progresses to Step S304.

In Step S304, the memory card 100 encrypts the title key: Kt and the individual key: Kind stored in the protected area #1 of the memory card 100 by the session key: Ks and outputs encrypted key data to the host equipment 140.

In Step S305, the host equipment 140 receives the encrypted key data from the memory card, and performs decryption processing by the session key: Ks to acquire the title key: Kt and the individual key: Kind.

In Step S306, the memory card 100 provides to the host equipment 140 a list as the replacement key application area information stored in the unprotected area of the memory card, that is, a list indicating the replacement key application area in the content encrypted by the title key: Kt and the replacement key: Ka received from the server.

A replacement key application area of the encrypted content stored in the unprotected area of the memory card 100 is replaced with an individual key application area.

The list is constituted by information regarding the value indicating the offset from the head of the content for each replacement key application area (=individual key application area) in the content and the area size.

Next, in Step S307, the host equipment 140 reads the encrypted content from the unprotected area of the memory card 100. The encrypted content is the encrypted content in which the encrypted areas by the title key: Kt and the individual key: Kind are mixed.

In Step S308, the host equipment 140 applies the title key: Kt and the individual key: Kind acquired in the processing of Step S305 to decrypt and reproduce the encrypted content read from the memory card 100.

The determination on which of the title key: Kt and the individual key: Kind is applied for decryption processing is performed with reference to the list as the replacement key application area information (=individual key application area information) read from the memory card 100 in Step S306.

6. Hardware Configuration Example of Each Apparatus

Finally, a hardware configuration example of each apparatus which performs the above-described processing will be described with reference to FIG. 16 and later.

First, a hardware configuration example of a server which performs content provision processing and an information recording apparatus or an information reproducing apparatus serving as a client which has loaded therein a memory card and performs data recording or reproduction processing will be described with reference to FIG. 16.

A CPU (Central Processing Unit) 701 functions as a data processing unit which performs various kinds of processing in accordance with a program stored in a ROM (Read Only Memory) 702 or a storage unit 708. For example, the CPU 701 performs communication processing between the server and the client, recording processing of received data to the memory card (a removable medium 711 in the drawing), data reproduction processing from the memory card (the removable medium 711 in the drawing), and the like described in the forgoing embodiment. A RAM (Random Access Memory) 703 appropriately stores a program which is executed by the CPU 701, data, or the like. The CPU 701, the ROM 702, and the RAM 703 are connected to each other by a bus 704.

The CPU 701 is connected to an input/output interface through the bus 704, and an input unit 706 which has various switches, a keyboard, a mouse, a microphone, or the like and an output unit 707 which has a display, a speaker, or the like are connected to the input/output interface 705. The CPU 701 performs various kinds of processing in response to a command input from the input unit 706 and outputs the processing result to, for example, the output unit 707.

The storage unit 708 which is connected to the input/output interface 705 has, for example, a hard disk or the like, and stores a program which is executed by the CPU 701 or various kinds of data. A communication unit 709 performs communication with an external apparatus through a network, such as Internet or a local area network.

A drive 710 which is connected to the input/output interface 705 drives the removable medium 711, such as a magnetic disc, an optical disc, a magneto-optical disc, or a semiconductor memory, and acquires various kinds of data, such as recorded contents, key information, and programs. For example, data processing based on an acquired program, data processing which is executed by the CPU using contents or key data, key generation, content encryption, recording processing, decryption, and reproduction processing based on a recording/reproducing program, or the like is performed.

Figure 17:
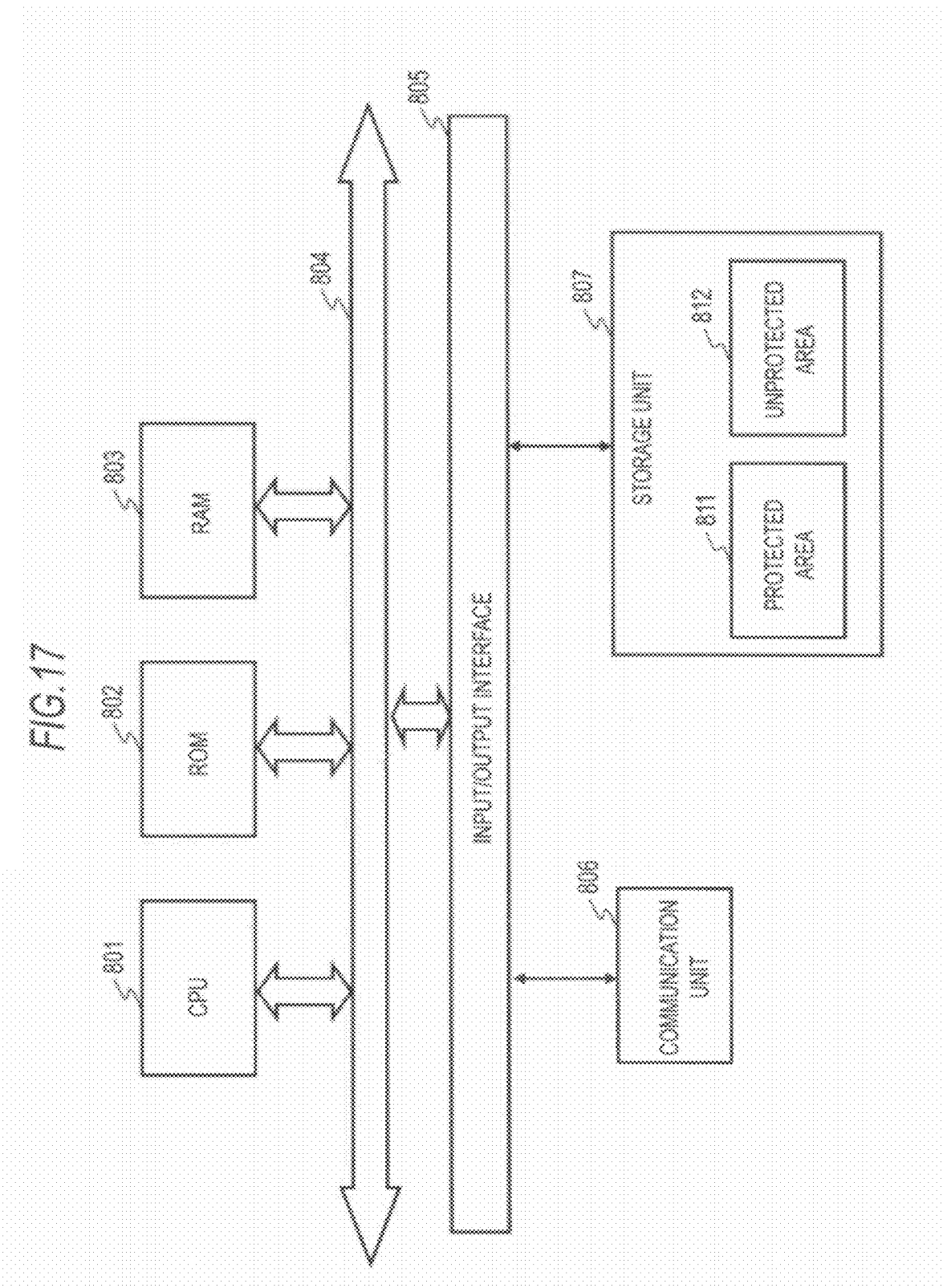
FIG. 17 is a diagram illustrating a hardware configuration example of a memory card.

FIG. 17 shows a hardware configuration example of a memory card.

A CPU (Central Processing Unit) 801 functions as a data processing unit which performs various kinds of processing in accordance with a program stored in a ROM (Read Only Memory) 802 or a storage unit 807. For example, the CPU 801 performs communication processing between the server, and the host equipment such as the recording apparatus, the reproducing apparatus or the like, processing for writing or reading data with respect to the storage unit 807, accessibility determination processing in terms of the divided areas of a protected area 811 of the storage unit 807, key replacement processing, or the like described in the foregoing embodiment. A RAM (Random Access Memory) 803 appropriately stores a program which is executed by the CPU 801, data, or the like. The CPU 801, the ROM 802, and the RAM 803 are connected to each other by a bus 804.

The CPU 801 is connected to an input/output interface 805 through the bus 804, and a communication unit 806 and the storage unit 807 are connected to the input/output interface 805.

The communication unit 804 which is connected to the input/output interface 805 performs communication with, for example, the server and the host equipment. The storage unit 807 is a data storage area, and as described above, has a protected area 811 where access restriction is made and an unprotected area 812 where data can be freely recorded and read.

The present disclosure has been described in detail in connection with a specific embodiment. However, it is obvious that those skilled in the art can make modifications or substitutions from the embodiment without departing from the spirit of the present disclosure. That is, the present disclosure has been described just for illustration and should not be interpreted to be limited to the embodiment. The scope of the present disclosure should be defined with reference to the accompanying drawings.

The series of processes described in the above description may be performed by hardware, software or a combination thereof. In the case where the process is performed by the software, a program in which a process sequence is recorded may be installed and executed in a memory in a computer which is assembled in specially used hardware, or may be installed and executed in a general-purpose computer which is capable of performing a variety of processes. For example, the program may be recorded in a recording medium in advance. The program may be installed to the computer from the recording medium, may be received through a network such as LAN (Local Area Network) or the Internet, or may be installed in a recording medium such as a built-in hard disk.

The variety of processes as described above may be performed in the described order in a time series manner, or may be performed in parallel or individually according to a processing ability of a processing apparatus or as necessary. The system in the embodiments has a configuration that a plurality of apparatuses is logically combined, and is not limited to a configuration where respective apparatuses are installed inside the same casing.

As described above, with the configuration according to the embodiment of the present disclosure, a configuration for preventing the unauthorized use of contents based on the release of an encryption key of contents is realized. For example, a replacement key application area encrypted by a replacement key included in a content received from a server is decrypted, key replacement processing for applying different individual keys in terms of content distribution to perform encryption, and an encrypted content after key replacement is stored in a data storage device. The key replacement processing is performed inside the data storage device, and the replacement key is stored in a protected area where access from the outside is inhibited. An individual key is stored in a second protected area where access to only an authorized apparatus is permitted. The encrypted contents after key replacement is an encrypted content which differs between clients, making it possible to specify a client as a release source of contents or an individual key.

The present disclosure contains subject matter related to that disclosed in Japanese Priority Patent Application JP 2010-282607 filed in the Japan Patent Office on Dec. 20, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A content providing system comprising:
    a server which provides to a host apparatus a first encrypted content including an encrypted area having applied thereto a replacement key;
    a host apparatus which receives the first encrypted content and replacement key application area information indicating the encrypted area having applied thereto the replacement key from the server; and
    a data storage device which receives the replacement key from the server and an individual key set in terms of content distribution processing from the server and performs key replacement processing for changing the replacement key application area of the first encrypted content to an encrypted area by the individual key to store a second encrypted content after the key replacement processing in a data recording area,
    wherein the server provides to the host apparatus an encrypted content in which the replacement key application area as the encrypted area having applied thereto the replacement key in the first encrypted content and a title key application area as an encrypted area having applied thereto a content-compliant title key are mixed, and the data storage device receives the replacement key, the individual key, and the title key from the server, stores the replacement key in a first protected area where access from the outside is not permitted, and stores the individual key and the title key in a second protected area where access from an authorized external apparatus is permitted.

2. The content providing system according to claim 1, wherein the data storage device stores the replacement key in a protected area where access from the outside is not permitted and performs the key replacement processing inside the data storage device.

3. The content providing system according to claim 1, wherein the host apparatus extracts encrypted area data having applied thereto the replacement key from the first encrypted content received from the server in reference to the replacement key application area information and provides the encrypted area data to the data storage device, and the data storage device performs key replacement processing for changing replacement key application encrypted area data received from the host apparatus to the encrypted area by the individual key.

4. A data storage device comprising:
    a data processing unit which performs key replacement processing for changing encrypted data in a content by a replacement key input from a server to encrypted data by an individual key set in terms of content distribution processing, the data processing unit receiving from the server the encrypted content in which a replacement key application area as an encrypted area having applied thereto the replacement key in a first encrypted content and a title key application area as an encrypted area having applied thereto a content-compliant title key are mixed, and the data processing unit also receives the individual key and the title key from the server;
a first protected area which is a storage area with the replacement key stored therein and in which access from the outside is inhibited; and
a second protected area which is a storage area with the individual key and the title key stored therein and in which access from an authorized external apparatus is permitted.

5. The data storage device according to claim 4, wherein the data storage device performs mutual authentication with a server, under the condition of the establishment of mutual authentication, receives the replacement key and the individual key from the server, stores the replacement key in the first protected area, and stores the individual key in the second protected area.

6. The data storage device according to claim 4, wherein the data storage device performs communication with a host apparatus to perform key replacement processing for changing replacement key application encrypted area data received from the host apparatus to an encrypted area by the individual key.

7. The data storage device according to claim 4, wherein the data storage device receives a host certificate recorded with access rights to the protected area from a host apparatus as a reproducing apparatus reproducing a content, and when the access rights of the host apparatus to the second protected area are authorized on the basis of the description of the host certificate, the data storage device provides the individual key stored in the second protected area to the host apparatus.

8. An information processing apparatus comprising:
a data processing unit that acquires a first encrypted content including an encrypted area having applied thereto a replacement key and replacement key application area information indicating an encrypted area having applied thereto the replacement key, the data processing unit receives from a server an encrypted content in which a replacement key application area as the encrypted area having applied thereto the replacement key in the first encrypted content and a title key application area as an encrypted area having applied thereto a content-compliant title key are mixed, and the data processing unit receives the replacement key, the individual key, and the title key from the server, stores the replacement key in a first protected area where access from the outside is not permitted, stores the individual key and the title key in a second protected area where access from an authorized external apparatus is permitted, extracts encrypted area data having applied thereto the replacement key from the first encrypted content in reference to the replacement key application area information, provides the encrypted area data to a data storage device, receives individual key encrypted area data generated by key replacement processing in the data storage device, generates a second encrypted content in which the received data is set in an original replacement key application area, and stores the second encrypted content in the data storage device.

9. The information processing apparatus according to claim 8, further comprising:
a communication unit which receives the first encrypted content and the replacement key application area information from a server, wherein the data processing unit performs mutual authentication processing with the server, and under the condition of the establishment of mutual authentication, receives the first encrypted content and the replacement key application area information from the server.

10. A server apparatus comprising:
a data processing unit which performs processing for acquiring or generating a first encrypted content including an encrypted area having applied thereto a replacement key, the replacement key, an individual key which is an encryption key after key replacement to the encrypted area of the replacement key and set in terms of content distribution processing, and replacement key application area information indicating the encrypted area having applied thereto the replacement key, and transmitting the first encrypted content, the replacement key, the individual key, a content-compliant title key, and the replacement key application area information to a client, the server provides to the client an encrypted content in which the replacement key application area as the encrypted area having applied thereto the replacement key in the first encrypted content and a title key application area as an encrypted area having applied thereto the content-compliant title key are mixed, and the client stores the replacement key in a first protected area where access from the outside is not permitted, and stores the individual key and the title key in a second protected area where access from an authorized external apparatus is permitted.

11. The server apparatus according to claim 10, wherein the data processing unit performs mutual authentication processing with a data storage device which constitutes the client, under the condition of the establishment of the mutual authentication processing, encrypts the replacement key and the individual key, and transmits the encrypted replacement key and individual key to the data storage device.

12. The server apparatus according to claim 10, wherein the data processing unit generates management information in which the individual key is associated with the client and stores the management information in a storage unit.

13. A reproducing apparatus which performs reproduction processing for reproducing an encrypted content including an encrypted area by an individual key set in terms of content distribution processing, the recording apparatus comprising:
a data processing unit which performs mutual authentication processing with a data storage device, under the condition of the establishment of the mutual authentication processing, reads the individual key from the data storage device, acquires encrypted area information indicating the encrypted area by the individual key from the data storage device, and performs key selection in reference to the encrypted area information to perform decryption processing of the encrypted content, the data processing unit receives from a server an encrypted content in which a replacement key application area as the encrypted area having applied thereto a replacement key in first encrypted content and a title key application area as an encrypted area having applied thereto a content-compliant title key are mixed, and the data processing unit receives the replacement key, the individual key, and the title key from the server, the data storage device stores the replacement key in a first protected area where access from the outside is not permitted, and stores the individual key and the title key in a second protected area where access from an authorized external apparatus is permitted.

14. An information processing method which is performed in a data storage device, the information processing method comprising:

causing a data processing unit to receive encrypted data by a replacement key from a server as input, the data processing unit receiving from the server an encrypted content in which the replacement key application area as the encrypted area having applied thereto the replacement key in the first encrypted content and a title key application area as an encrypted area having applied thereto a content-compliant title key are mixed;

causing the data processing unit to acquire the replacement key from a first protected area where access from the outside is inhibited and to perform decryption processing of the encrypted data to generate decrypted data; and causing the data processing unit to acquire the title key and an individual key set in terms of content distribution processing from a second protected area where access from an authorized external apparatus is permitted and to apply the acquired individual key to encrypt the decrypted data and to perform key replacement processing.

15. An information processing method which is performed in an information processing apparatus, the information processing method comprising:

causing a data processing unit to acquire a first encrypted content including an encrypted area having applied thereto a replacement key and replacement key application area information indicating the encrypted area having applied thereto the replacement key, the data processing unit receiving from a server an encrypted content in which a replacement key application area as the encrypted area having applied thereto the replacement key in the first encrypted content and a title key application area as an encrypted area having applied thereto a content-compliant title key are mixed, and the data processing unit receives the replacement key, the individual key, and the title key from the server, a data storage device stores the replacement key in a first protected area where access from the outside is not permitted, and stores the individual key and the title key in a second protected area where access from an authorized external apparatus is permitted, extract encrypted area data having applied thereto the replacement key from the first encrypted content in reference to the replacement key application area information, provide the encrypted area data to the data storage device, receive individual key encrypted area data generated by key replacement processing in the data storage device, generate a second encrypted content in which the received data is set in an original replacement key application area, and store the second encrypted content in the data storage device.

16. An information processing method in a server apparatus which performs content distribution, the information processing method comprising:

causing a data processing unit to acquire or generate a first encrypted content including an encrypted area having applied thereto a replacement key, the replacement key, and an individual key which is an encryption key after key replacement to the encrypted area of the replacement key and set in terms of content distribution processing, and replacement key application area information indicating the encrypted area having applied thereto the replacement key, and transmit the first encrypted content, the replacement key, the individual key, and the replacement key application area information to a client, the data processing unit providing to the client an encrypted content in which the replacement key application area as the encrypted area having applied thereto the replacement key in the first encrypted content and a title key application area as an encrypted area having applied thereto a content-compliant title key are mixed, and the client stores the replacement key in a first protected area where access from the outside is not permitted, and stores the individual key and the title key in a second protected area where access from an authorized external apparatus is permitted.

17. A non-transitory computer readable medium encoded with a program which causes a data storage device to perform a method comprising:

causing a data processing unit to receive encrypted data by a replacement key from a server as input, the data processing unit receiving from the server an encrypted content in which the replacement key application area as the encrypted area having applied thereto the replacement key in the first encrypted content and a title key application area as an encrypted area having applied thereto a content-compliant title key are mixed;

causing the data processing unit to acquire the replacement key from a first protected area where access from the outside is inhibited and to perform decryption processing of the encrypted data to generate decrypted data; and causing the data processing unit to acquire the title key and an individual key set in terms of content distribution processing from a second protected area where access from an authorized external apparatus is permitted and to apply the acquired individual key to encrypt the decrypted data and to perform key replacement processing.

18. A non-transitory computer readable medium encoded with a program which causes an information processing apparatus to perform a method comprising:

causing a data processing unit to acquire a first encrypted content including an encrypted area having applied thereto a replacement key and replacement key application area information indicating the encrypted area having applied thereto the replacement key, the data processing unit receiving from a server an encrypted content in which a replacement key application area as the encrypted area having applied thereto the replacement key in the first encrypted content and a title key application area as an encrypted area having applied thereto a content-compliant title key are mixed, and the data processing unit receives the replacement key, the individual key, and the title key from the server, a data storage device stores the replacement key in a first protected area where access from the outside is not permitted, and stores the individual key and the title key in a second protected area where access from an authorized external apparatus is permitted, extract encrypted area data having applied thereto the replacement key from the first encrypted content in reference to the replacement key application area information, provide the encrypted area data to the data storage device, receive individual key encrypted area data generated by key replacement processing in the data storage device, generate a second encrypted content in which the received data is set in an original replacement key application area, and store the second encrypted content in the data storage device.

19. A non-transitory computer readable medium encoded with a program which causes a server apparatus performing content distribution to perform information processing that causes a data processing unit to perform a method comprising:

acquiring or generating a first encrypted content including an encrypted area having applied thereto a replacement key, the replacement key, and an individual key which is an encryption key after key replacement to the encrypted area of the replacement key and set in terms of content distribution processing, and replacement key application area information indicating the encrypted area having applied thereto the replacement key, and transmitting the first encrypted content, the replacement key, the individual key, and the replacement key application area information to a client, the data processing unit providing to the client an encrypted content in which the replacement key application area as the encrypted area having applied thereto the replacement key in the first encrypted content and a title key application area as an encrypted area having applied thereto a content-compliant title key are mixed, and the client stores the replacement key in a first protected area where access from the outside is not permitted, and stores the individual key and the title key in a second protected area where access from an authorized external apparatus is permitted.

* * * * *